United States Patent
Gorain

(10) Patent No.: US 9,346,062 B2
(45) Date of Patent: May 24, 2016

(54) SEPARATION OF COPPER MINERALS FROM PYRITE USING AIR-METABISULFITE TREATMENT

(75) Inventor: Barun Gorain, Toronto (CA)

(73) Assignee: Barrick Gold Corporation, Toronto (CA)

( * ) Notice: Subject to any disclaimer, the term of this patent is extended or adjusted under 35 U.S.C. 154(b) by 1119 days.

(21) Appl. No.: 12/960,041

(22) Filed: Dec. 3, 2010

(65) Prior Publication Data

US 2011/0155651 A1    Jun. 30, 2011

Related U.S. Application Data

(60) Provisional application No. 61/266,770, filed on Dec. 4, 2009.

(51) Int. Cl.
| | | |
|---|---|---|
| *B03D 1/14* | (2006.01) | |
| *B03D 1/00* | (2006.01) | |
| *C02F 1/24* | (2006.01) | |
| *C22B 1/00* | (2006.01) | |
| *C22B 15/00* | (2006.01) | |
| *B03D 1/08* | (2006.01) | |
| *B03D 1/002* | (2006.01) | |
| *B03B 5/60* | (2006.01) | |
| *B03B 5/64* | (2006.01) | |
| *B01D 1/00* | (2006.01) | |
| *C21B 15/00* | (2006.01) | |

(52) U.S. Cl.
CPC ............... *B03D 1/085* (2013.01); *B03D 1/002* (2013.01); *C22B 15/0008* (2013.01); *B03D 2201/06* (2013.01); *B03D 2203/02* (2013.01); *B03D 2203/025* (2013.01)

(58) Field of Classification Search
None
See application file for complete search history.

(56) References Cited

U.S. PATENT DOCUMENTS

| | | | |
|---|---|---|---|
| 1,274,505 A | 8/1918 | Bradford | |
| 1,377,189 A | 5/1921 | Dosenbach | |
| 1,397,703 A | 11/1921 | Robbins | |
| 1,469,042 A | 9/1923 | Hellstrand | |

(Continued)

FOREIGN PATENT DOCUMENTS

| | | |
|---|---|---|
| AU | 499430 | 4/1979 |
| AU | 41759/78 | 5/1979 |

(Continued)

OTHER PUBLICATIONS

Hendricks, et al. "Mattagami Lake Mines Limited", in Milling Practice in Canada; Pickett, D.E., The Canadian Institute of Mining and Metallurgy, 1978, pp. 177-180.*

(Continued)

*Primary Examiner* — Nam Nguyen
*Assistant Examiner* — Clare Perrin
(74) *Attorney, Agent, or Firm* — Sheridan Ross P.C.

(57) ABSTRACT

The present invention relates to flotation of sulfidic copper-molybdenum- and gold-containing minerals. More specifically, the invention relates to sulfoxy reagent-assisted flotation for separating of sulfides of copper, molybdenum and gold from pyrite, marcasite, pyrrhotite, arsenopyrite, and other gangue minerals following aerating by an oxidizing gas and contacting by a sulfoxy reagent. To promote collection and flotation the feed mineral materials are preferably not contacted with an externally generated non-oxidizing gas to lower the dissolved molecular oxygen content prior to flotation.

118 Claims, 8 Drawing Sheets

(56) References Cited

U.S. PATENT DOCUMENTS

| | | |
|---|---|---|
| 1,478,697 A | 12/1923 | Bragg |
| 1,486,297 A | 3/1924 | Pallanch |
| 1,505,323 A | 8/1924 | Eberenz et al. |
| 1,678,259 A | 7/1928 | Martin |
| 2,007,176 A | 7/1935 | Brinker |
| 2,048,370 A | 7/1936 | Brinker |
| 2,154,092 A | 4/1939 | Hunt |
| 2,342,277 A | 2/1944 | Herkenhoff |
| 2,512,669 A | 6/1950 | Morrow |
| 3,893,915 A | 7/1975 | Mercade |
| 3,919,080 A | 11/1975 | Stauter |
| 3,961,028 A | 6/1976 | Parker |
| 4,034,063 A | 7/1977 | Rosar |
| 4,113,848 A | 9/1978 | Parker |
| 4,270,926 A | 6/1981 | Burk, Jr. et al. |
| 4,283,017 A | 8/1981 | Coale et al. |
| 4,317,715 A | 3/1982 | Hintikka et al. |
| 4,460,459 A | 7/1984 | Shaw et al. |
| 4,549,959 A | 10/1985 | Armstrong et al. |
| 4,650,569 A | 3/1987 | Vargas |
| 4,735,783 A | 4/1988 | Bulatovic |
| 4,744,893 A | 5/1988 | Rothenberg |
| 4,879,022 A | 11/1989 | Clark et al. |
| 4,902,765 A | 2/1990 | Wang |
| 4,904,374 A | 2/1990 | Singer et al. |
| 5,019,246 A | 5/1991 | Wang |
| 5,037,533 A * | 8/1991 | Piedrahita et al. ............ 209/166 |
| 5,074,994 A | 12/1991 | Ray et al. |
| 5,171,428 A | 12/1992 | Beattie et al. |
| 5,505,857 A | 4/1996 | Misra et al. |
| 5,756,622 A | 5/1998 | Wang et al. |
| 5,766,930 A | 6/1998 | Kohr |
| 5,807,479 A * | 9/1998 | Arbiter ........................ 209/164 |
| 5,855,770 A | 1/1999 | Clark et al. |
| 5,992,640 A * | 11/1999 | Clark et al. ................... 209/166 |
| 6,032,805 A | 3/2000 | Clark et al. |
| 6,041,941 A | 3/2000 | Newell et al. |
| 6,092,666 A | 7/2000 | Clark et al. |
| 6,159,726 A | 12/2000 | Kohr |
| 6,280,501 B1 | 8/2001 | Ferron |
| 6,427,843 B1 * | 8/2002 | Clark ........................... 209/164 |
| 6,451,275 B1 | 9/2002 | Fleming |
| 6,660,059 B2 | 12/2003 | Ji et al. |
| 6,679,383 B2 | 1/2004 | Gathje |
| 7,004,326 B1 * | 2/2006 | Dai et al. ..................... 209/166 |
| 7,066,983 B2 | 6/2006 | Ji et al. |
| 7,219,804 B2 | 5/2007 | Simmons |
| 7,360,656 B2 | 4/2008 | Santos |
| 7,537,640 B2 | 5/2009 | Wan et al. |
| 7,559,973 B2 | 7/2009 | Wan et al. |
| 7,559,974 B2 | 7/2009 | Ji et al. |
| 2002/0152845 A1 | 10/2002 | Fleming et al. |
| 2004/0197249 A1 | 10/2004 | Wan et al. |
| 2004/0200760 A1 * | 10/2004 | Rodopoulos et al. ......... 209/166 |
| 2005/0112741 A1 | 5/2005 | Kohr |
| 2006/0151360 A1 | 7/2006 | Wright et al. |
| 2006/0151397 A1 | 7/2006 | Wright et al. |
| 2008/0029460 A1 | 2/2008 | Wright et al. |
| 2009/0004728 A1 | 1/2009 | Kohr |
| 2009/0074607 A1 * | 3/2009 | Hillier et al. .................. 420/501 |

FOREIGN PATENT DOCUMENTS

| | | | |
|---|---|---|---|
| AU | 578327 | 10/1988 | |
| AU | 593065 | 2/1990 | |
| AU | 50588/93 | 7/1995 | |
| AU | 660858 | 11/1995 | |
| AU | 39027/95 | 5/1996 | |
| CA | 853248 | 10/1970 | |
| CA | 1106529 | 8/1981 | |
| CA | 1238430 | 6/1988 | |
| CA | 1238430 A1 * | 6/1988 | ............ B03D 1/02 |
| CA | 1265876 | 2/1990 | |
| CA | 2082831 | 5/1994 | |
| CA | 2181166 | 7/1995 | |
| CA | 2163688 | 5/1996 | |
| CA | 2367606 | 11/2000 | |
| CL | 1828-95 | 9/1996 | |
| CL | 1607-98 | 2/1999 | |
| CL | 1608-98 | 4/1999 | |
| JP | 56-144757 | 11/1981 | |
| JP | 60-220155 | 11/1985 | |
| RU | 2096091 | 11/1997 | |
| RU | 2398633 | 9/2010 | |
| WO | WO 89/00457 | 1/1989 | |
| WO | WO 89/10792 | 11/1989 | |
| WO | WO 95/19320 | 7/1995 | |
| WO | WO 96/01150 | 1/1996 | |
| WO | WO 2004/092448 | 10/2004 | |
| WO | WO 2008/092995 | 8/2008 | |
| WO | WO 2008156835 A2 * | 12/2008 | ............ B03D 1/14 |
| WO | WO 2009/147153 | 12/2009 | |

OTHER PUBLICATIONS

Trujillo, et al. Chapter 6: Water and Seawater, accessed online May 27, 2014, pp. 174-190, website: http://www.gps.caltech.edu/classes/ge1/document/ThurmanTrujilloOceanographyCh6.pdf.*

Fullston, et al. "Zeta potential study of the oxidation of copper sulfide minerals", Colloids and Surfaces A, 1999, 146, 113-121, Eselvier.*

Official Action with English Translation for Russia Patent Application No. 201200839, dated Oct. 29, 2013 4 pages.

Official Action for Chinese Patent Application No. 201080063212.4, mailed May 27, 2013, 4 pages.

Hendricks et al., "Mattagami Lake Mines Limited," in Milling Practice in Canada, Pickett, D.E. (ed.), The Canadian Institute of Mining and Metallurgy, 1978, pp. 177-180.

International Search Report for International (PCT) Patent Application No. PCT/IB2010/003538, mailed Jun. 29, 2011.

Written Opinion for International (PCT) Patent Application No. PCT/IB2010/003538, mailed Jun. 29, 2011.

Background of the Invention for the above-captioned application filed Dec. 3, 2010 (previously provided).

International Preliminary Report on Patentability for International (PCT) Patent Application No. PCT/IB2010/003538, mailed Jun. 14, 2012 8 pages.

Official Action for Australia Patent Application No. 2010325688, dated Aug. 21, 2013 4 pages.

Official Action with English Translation for Russia Patent Application No. 201200839, dated Sep. 11, 2013 4 pages.

Official Action (English translation) for Chinese Patent Application No. 201080063212.4, dated Jan. 20, 2014, 2 pages.

Office Action (with partial English translation) for Chilean Patent Application No. 1446-2012, dated Sep. 10, 2014, 9 pages.

Official Action (with English translation) for Georgian Patent Application No. 161069, dated Aug. 4, 2014, 9 pages.

Notice of Acceptance for Australia Patent Application No. 2010325688, dated Mar. 26, 2014 2 pages.

Notice of Allowance (with English translation) for Chinese Patent Application No. 201080063212.4, dated Jun. 9, 2014, 4 pages.

Extended European Search Report and Opinion for European Patent Application No. 10834290.8, dated Jun. 10, 2014 11 pages.

Agar, "Flotation of chalcopyrite, pentlandite, pyrrhotite ores," Int. J. Miner. Process., 1990, vol. 33, pp. 1-19.

Khmeleva et al., "Surface study of the effect of sulphite ions on copper-activated pyrite pre-treated with xanthate," Minerals Engineering, 2003, vol. 16, pp. 601-608.

Grano et al. "Control of the Solution Interaction of Metabisulphite and Ethyl Xanthate in the Flotation of the Hilton Ore of Mount Isa Mines Limited," Minerals Engineering, United Kingdom, Jan. 1997, vol. 10, No. 1, pp. 17-39.

Official Action for ARIPO Patent Application No. AP/P/2012/006348, dated Feb. 12, 2015 39 pages.

Official Action with English Translation for Japan Patent Application No. 2012-541598, mailed Mar. 3, 2015 11 pages.

\* cited by examiner

Figure 5: Copper Grade Recovery Curve for Various Flotation Reagent Schemes in Tap Water
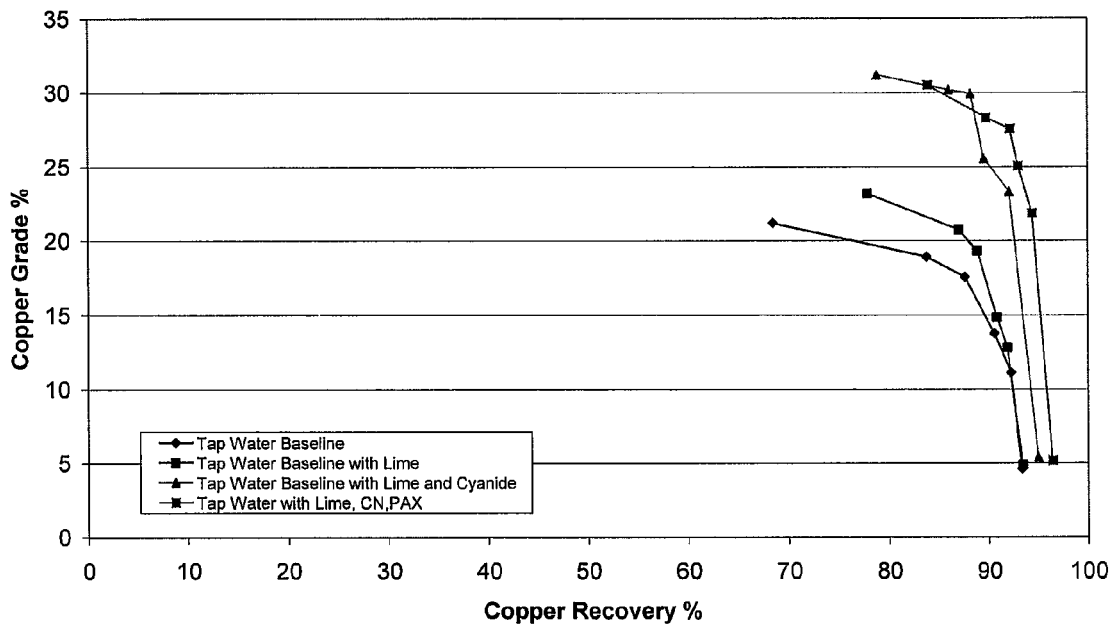
Figure 6: Copper Grade Recovery Curve for Various Flotation Reagent Schemes in Salt Water
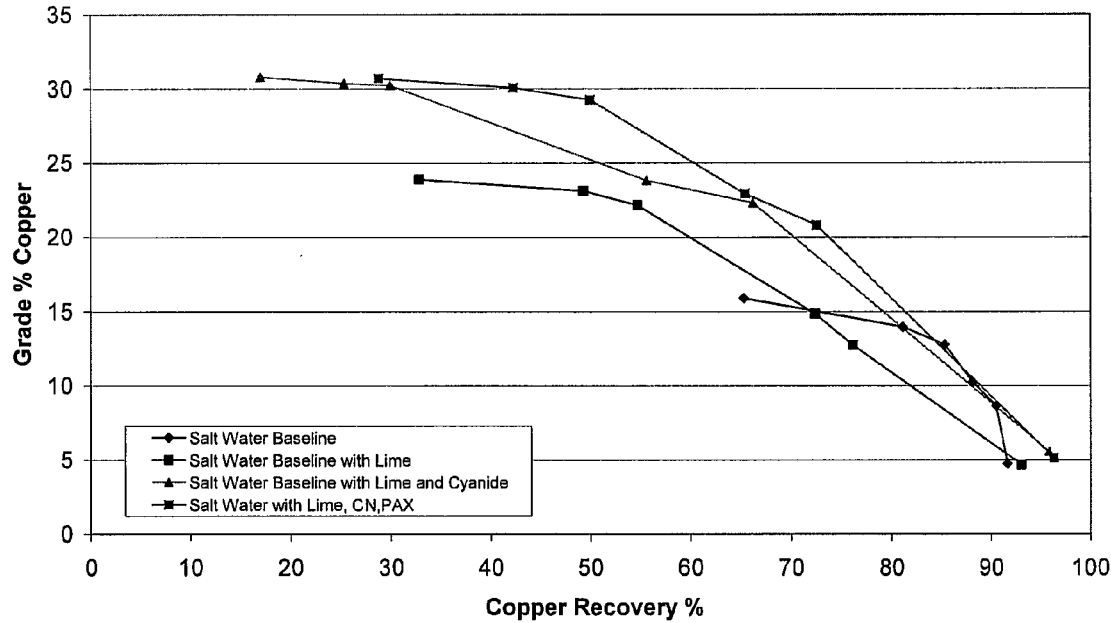

Figure 7: Copper Grade Recovery Curve for Various Flotation Reagent Schemes in Tap Water, MBS Addition with and without aeration
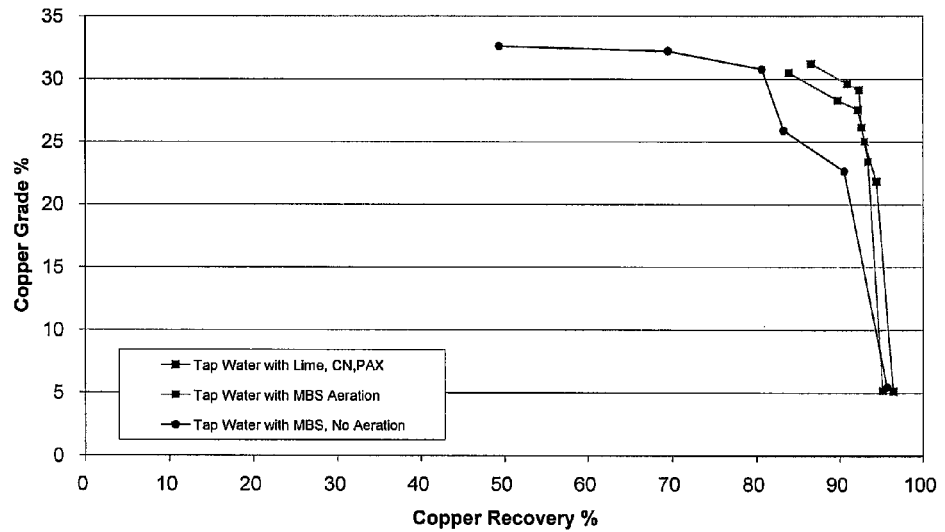
Figure 8: Copper Grade Recovery Curve for Various Flotation Reagent Schemes in Salt Water, MBS Addition with and without aeration
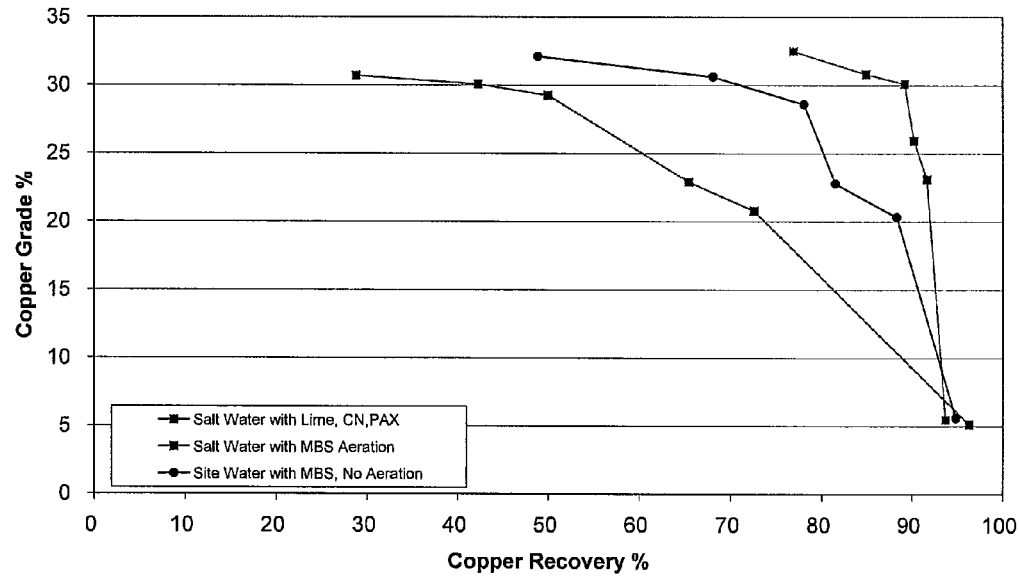

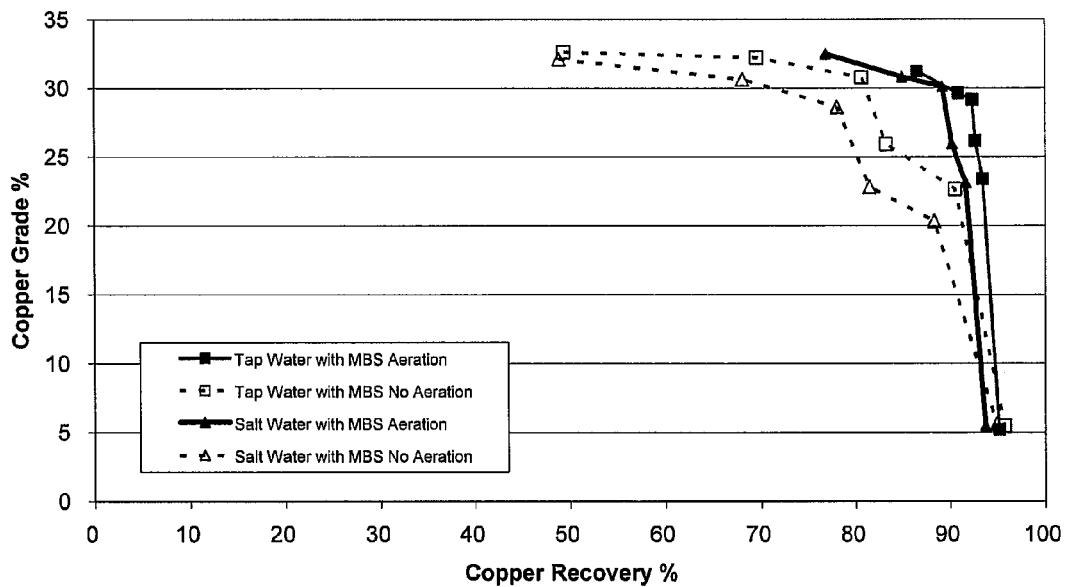
Figure 9: Copper Grade Recovery Curve in Salt and Tap Water with MBS with and without aeration after MBS addition
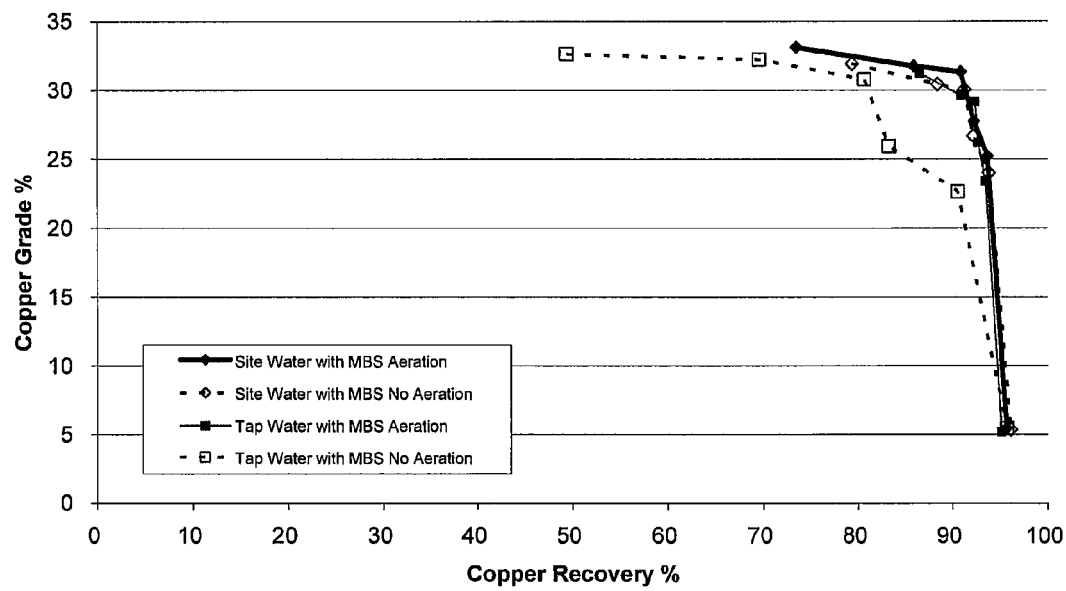
Figure 10: Copper Grade Recovery Curve in Site and Tap Water with MBS with and without aeration after MBS Addition

SEPARATION OF COPPER MINERALS FROM PYRITE USING AIR-METABISULFITE TREATMENT

CROSS REFERENCE TO RELATED APPLICATION

The present application claims the benefits of U.S. Provisional Application Ser. No. 61/266,770, filed Dec. 4, 2009, entitled "Separation of Copper Minerals from Pyrite in Buffered Water Solutions Using Air-Metabisulfite Treatment", which is incorporated herein by this reference in its entirety.

FIELD

The invention relates generally to metal recovery and particularly to recovery of copper, molybdenum and/or gold minerals by flotation in waters with a range of buffering capacities and/or salinities.

BACKGROUND

The employment of flotation to upgrade valuable minerals from pyrite and other gangue minerals is generally performed at an alkaline pH. Alkalinity is controlled by the addition of lime or other alkaline compounds. Lime is normally employed as it is a relatively inexpensive reagent; however, large amounts of lime and other reagents are required when the water available to the flotation circuit possesses a high buffering capacity. In other words, a large amount of lime is necessary to alter and maintain the pH at the optimal operating conditions. The addition of lime can also depress the flotation of minerals such as chalcopyrite, sphalerite, molybdenite, pyrite, pyrrhotite, and gold and other precious metals via the deposition of calcium on the metal surface.

Commonly, in sulfide flotation, the effectiveness of flotation agents is controlled by the level of alkalinity or acidity in the flotation feed or pulp pH regulators such as lime, soda ash and, to a lesser extent, caustic soda, are often employed as the pH controlling agents. Lime is the most commonly used agent because of its cost, availability and ability to maintain pH values of pH 10.5 and above. Adjustment of the pH of the pulp to pH 11.0 is required to depress the gangue sulfide minerals of iron, such as pyrite and pyrrhotite. The costs associated with adding lime can be significant and the effectiveness of lime as a depressant has been shown herein to be reduced in waters containing high levels of dissolved salts or are highly buffered.

Other sulfide depressants have been employed to depress pyrite, such as cyanide or sodium hydrosulfide, in conjunction with pH modification. They cannot be used over a wide pH range and require high pH values, so that high lime consumption remains an issue. In addition these depressants may not be sufficiently selective at economic dosages. The use of sulfoxy compounds to improve the recovery of sulfide minerals was described as far back as U.S. Pat. No. 2,154,092 to Hunt. This patent describes a process to treat ores containing carbonaceous or graphitic substances associated with gangue components. These carbonaceous substances may either remain with the valuable ore mineral during flotation and reduce the grade or coat the valuable minerals, thereby reducing their recovery by flotation. To prevent this, sulfur dioxide or any other reducing gas, is added to the pulp, without mixing it with air, to inhibit the flotation of the deleterious gangue and carbon coated minerals.

When the sulfur dioxide gas is added, Hunt states that the resulting pH of the pulp water is usually on the acid side (<pH 7). In some cases, depending on the natural alkalinity of both the ore and the milling water, the pulp may remain alkaline. The process can be carried out when the pulp is either acid or alkaline.

Hunt teaches that the reducing gas may also be internally generated in the ore pulp itself by the action of one or more suitable chemicals. For example, when sulfuric acid and an alkaline (base) or alkaline earth sulfite, bisulfite, or thiosulfate are added to an ore pulp, sulfur dioxide will be one of the products resulting from the interaction.

A number of other patents have employed sulfoxy compounds in sulfide flotation circuits.

U.S. Pat. No. 5,171,428 to Beattie, et al., describes a process to separate arsenopyrite from a mixture with pyrite by contacting the mixture with a sulfitic agent providing $HSO_3^-$ ion. The process is performed at an elevated temperature and a pH below about pH 8 for a period sufficient to impart a selective depression of arsenopyrite.

U.S. Pat. Nos. 6,032,805, and 6,092,666 to Clark, et al., disclose a method for reducing the consumption of alkaline pH modifiers by using a sulfoxy radical-containing reagent. Prior to or simultaneously with the introduction of the sulfoxy radical-containing reagent, a non-oxidizing gas (such as an inert or reducing gas) is added in a quantity sufficient to achieve a chemical environment conducive to the flotation separation of minerals. Prior to collector and frother addition but after contact with the non-oxidizing gas, the slurry, only when necessary, is aerated by an oxidizing gas to a particular dissolved oxygen concentration or electrochemical potential suitable for flotation.

U.S. Pat. No. 6,041,941 to Newell, et al., presents a similar process to Clark, et al., with the aim of reducing reagent consumption and mineral scale formation in flotation circuits. In the process of Clark, et al., the non-oxidizing gas is added to prevent the oxidation of the sulfoxy radical. The non-oxidizing gas is introduced during the reagent conditioning and flotation stages. At these stages, the dissolved oxygen in the slurry is most likely to degrade the sulfoxy compounds and result in scale formation.

There is a need for a process that can separate valuable metal-containing sulfide minerals from other sulfide minerals, particularly sulfidic gangue minerals, while controlling levels of reagent consumption in waters with a significant range of buffering capacities and/or salinities, without the addition of lime or other pH modifiers.

SUMMARY

These and other needs are addressed by the various embodiments and configurations of the present invention. The invention is directed generally to sulfoxy reagent-assisted flotation separation of valuable metal sulfide minerals from other sulfides, particularly pyrite, marcasite, pyrrhotite, arsenopyrite, and other gangue minerals.

In an embodiment, a sulfoxy reagent, preferably an ammonium, hydrogen, alkali metal, and/or alkaline earth metal metabisulfite, is added to an aerated, slurried valuable metal-containing sulfidic feed material prior to flotation. The process is particularly applicable to the flotation separation of copper sulfides, such as chalcocite ($Cu_2S$), bornite ($Cu_5FeS_4$), chalcopyrite ($CuFeS_2$), covellite ($CuS$), tetrahedrite ($Cu_{12}Sb_4S_{13}$), tennantite ($Cu_{12}As_4S_{13}$), and enargite ($Cu_3AsS_4$) and/or molybdenum sulfide (e.g., as molybdenite ($MoS_2$)), on the one hand from pyrite ($FeS_2$), marcasite ($FeS_2$), pyrrhotite ($Fe_{1-x}S$), arsenopyrite (FeAsS) on the other. The sulfoxy reagent acts as a depressant of the gangue sulfide minerals. In this manner, a highly selective flotation separation of different sulfide minerals can be realized.

Unlike conventional flotation processes which strip molecular oxygen from the slurry prior to sulfoxy reagent addition, the sulfoxy reagent is added to an aerated valuable metal-containing feed material. The aeration step is operated to the extent that a thin layer of surface oxidation is formed on copper sulfide minerals to promote the adsorption of the collector and therefore flotation of the copper minerals. To promote the formation of this layer, the slurried valuable metal-containing feed material is preferably not contacted with an externally generated non-oxidizing gas to lower the dissolved molecular oxygen content, prior to the floating step.

In some embodiments, the sulfoxy reagent is introduced after aeration and before pulp conditioning with the collector and frother.

In some embodiments, the sulfoxy reagent is introduced not only after aeration but additionally in the primary and/or secondary grinding circuit. While not wishing to be bound by any theory, this enables the sulfoxy reagent to contact freshly exposed and unoxidized mineral sulfide surfaces, thereby enhancing the effectiveness of the reagent.

In some embodiments, the flotation process is performed at natural pH and in the substantial absence of pH modification. Stated another way, no acid or base is added to adjust the pH of the slurried feed material at any stage in the comminution and flotation circuits unless pH modification is performed for economic reasons, such as to reduce sulfoxy reagent dosage, reduce any corrosion effect, and/or to avoid a lower pH situation when high sulfoxy reagent dosage is needed. pH modification, however, must be carefully controlled to avoid adversely impacting valuable metal recovery or concentrate grade.

The process can use, in pulp formation, any quality of water, whether fresh, brackish, or salt water and regardless of the degree of buffering.

The combination of the aeration stage followed by a sulfoxy reagent addition stage, and in the absence of pH adjustment, can result in increased copper sulfide mineral flotation rate and recovery and improved copper sulfide mineral concentrate grade. Although the dissolved molecular oxygen level produced by aeration may, in certain situations, increase sulfoxy reagent consumption, the substantial improvement in kinetics and elimination of lime reagent requirements can more than offset any increase in sulfoxy reagent costs. This process is particularly useful when the water available to form the flotation pulp contains significant buffering capacity and is effective over a broad pulp pH range. In fact, the process can be more cost effective in terms of recovery and reagent consumption than conventional processes using lime addition and cyanide. The process has demonstrated superior performance when used in water containing negligible to significant buffering capacity or salinity. Accordingly, the process is particularly useful for concentrator operations whose only available source of water is sea water or brackish ground water.

These and other advantages will be apparent from the disclosure of the invention(s) contained herein.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "brackish water" refers to water having more salinity than fresh water but not as much as salt water. Typically, brackish water has a salinity ranging from about 0.1 parts per thousand (0.01%) to about 25 parts per thousand (2.5%).

The term "buffering capacity" refers to the degree to which a solution can resist the alteration of its pH when external pH modifiers are added.

The term "dissolve" and variations thereof refer to is the process by which a solid or liquid enters its aqueous phase (solution).

The term "metabisulfite" refers to the oxyanion of sulfur $S_2O_5^{2-}$ or any salt containing this ion. Metabisulfite usually is in the form of a metal and the bisulfite anion ($S_2O_5$), usually in the form of an alkali or alkaline earth metal metabisulfite.

The term "mineral" and variations thereof refer to any naturally formed chemical substance having a definite chemical composition and characteristic crystal structure.

The term "natural pH" refers to the pH of a solution in the substantial absence of intentional pH modification. Intentional pH modification occurs when an acid or base is added to a solution for the purpose of adjusting the pH. An example of unintentional pH modification is when pH is adjusted by aeration, pulp conditioning with a flotation reagent (such as a collector, frother, activator, depressant, dispersant, and the like), or sulfoxy reagent addition.

The term "precious metal" refers generally to gold and silver.

The term "solution derived therefrom" refers to a solution having at least one common component with the source solution from which the solution is derived, directly or indirectly. For example, a solution having a leaching agent, contaminant, or valuable metal found in the source solution is deemed to be derived therefrom. Thus, a raffinate or barren solution is deemed to be a solution derived from a pregnant leach solution. Likewise, a loaded extractant or electrolyte, which contains the valuable metal, or strip solution are deemed to be derived, directly or indirectly, from the pregnant leach solution. Likewise, a slurried concentrate or tailings is deemed to be derived from the feed material to the flotation stage.

The term "sulfide mineral" refers to a mineral containing metal as the cation and sulfide ($S^{2-}$) as the major anion.

The term "sulfoxy reagent" refers to a composition containing an ingredient in which oxygen is directly bonded to S, such as $S=O$, $SO_3X$, $SO_4$, etc., or which acts as a source for the sulfoxy radical.

The term "salt water" refers to water, typically ocean or seawater, having a salinity of about 25 parts per thousand (2.5%) or more, more typically of about 30 parts per thousand (3.0%) or more, and even more typically of about 35 parts per thousand (3.5%) or more. Salt water typically has a total dissolved solids of about 10,000 mg/L or more, even more preferably of about 20,000 mg/L or more, and even more preferably of about 25,000 mg/L or more. Although seawater contains more than 70 elements, most seawater salts are ions of six major elements: chloride, sodium, sulfate, magnesium, calcium, and potassium.

The term "salinity" refers to the dissolved salt content of a body of water. It describes the levels of different salts such as sodium chloride, magnesium and calcium sulfates, and bicarbonates.

The term "sulfite" are compounds that contain the sulfite ion SO (additive IUPAC name: trioxidosulfate(2−)). The sulfite ion is the conjugate base of sulfurous acid.

The term "valuable metal" refers to silver, gold, a nonferrous base metal (nickel, lead, copper, and zinc), cobalt, molybdenum and mixtures thereof, with copper being a common metal in the sulfide matrix.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present invention(s). These drawings, together with the description, explain the principles of the invention(s). The drawings simply illustrate preferred and alternative examples of how the invention(s) can be made and used and are not to be construed as limiting the invention(s) to only the illustrated and described examples. Further features and advantages will become apparent from the following, more detailed, description of the various embodiments of the invention(s), as illustrated by the drawings referenced below.

FIG. 5 is a copper recovery curve for various flotation reagent schemes in tap water and plots copper grade (%) against copper recovery (%);

FIG. 6 is a copper recovery curve for various flotation reagent schemes in salt water and plots copper grade (%) against copper recovery (%);

FIG. 7 is a copper recovery curve for various flotation reagent schemes in tap water and plots copper grade (%) against copper recovery (%);

FIG. 8 is a copper recovery curve for various flotation reagent schemes in salt water and plots copper grade (%) against copper recovery (%);

FIG. 9 is a copper recovery curve in salt water and tap water with MBS addition, with and without aeration, and plots copper grade (%) against copper recovery (%); and FIG. 10 is a copper recovery curve in brackish site water and tap water with MBS addition, with and without aeration, and plots copper grade (%) against copper recovery.

DETAILED DESCRIPTION

The process described herein employs the addition of a sulfoxy reagent, preferably a metabisulfite, to one or more points in a flotation circuit. In one process configuration, the addition of the sulfoxy reagent is preceded by a period of, typically intense, aeration, in which an oxidizing atmosphere and dissolved molecular oxygen is actively promoted, rather than prevented or inhibited. The combination of aeration with sulfoxy reagent addition, without adjustment of the pH of the resulting pulp with a base, such as lime, caustic soda, or soda ash, or an acid, such as sulfuric acid, and in the absence of sulfide depressants, such as cyanide or hydrosulfide, can show a marked improvement over the addition of a sulfoxy reagent without, or in the absence of, the aeration step and can be more cost effective in terms of recovery and reagent consumption than conventional processes that employ base and/or sulfide depressant addition. In addition, the process can have superior performance when used in water containing negligible to a significant amount of salinity. This process can be particularly useful for concentrator operations whose only available source of water is sea water or brackish ground water. In other embodiments, the sulfoxy reagent is introduced not only after aeration but additionally in a grinding circuit, particularly the secondary grinding circuit.

Figure 1:
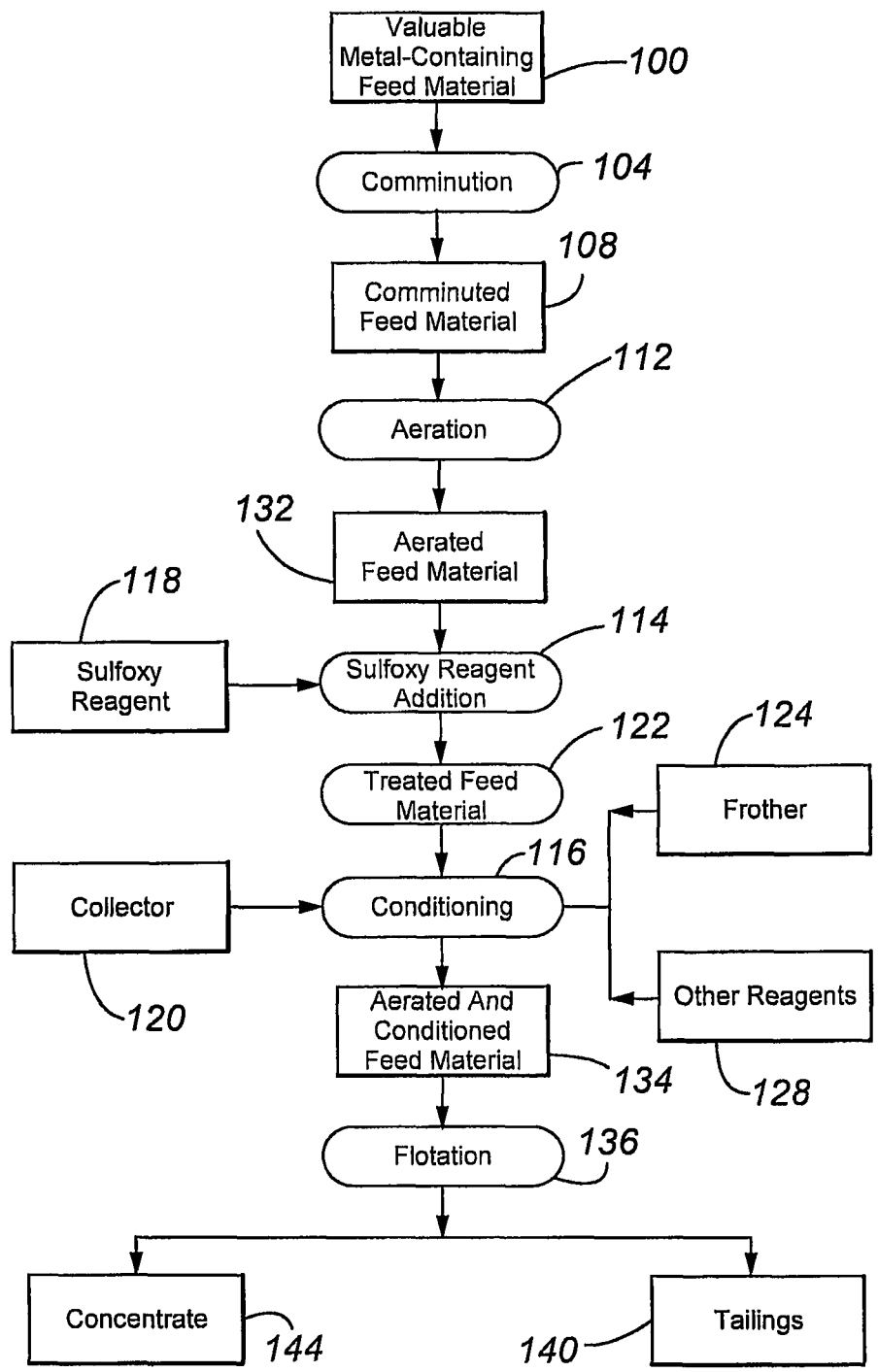
FIG. 1 is a flowchart of a process according to an embodiment.

Referring to FIG. 1, a valuable metal-containing feed material 100 can be any suitable copper- and/or molybdenum containing material, particularly mined ore, tailings, concentrate, or other residue of a metal recovery process. The feed material 100 includes not only one or more copper and/or molybdenum sulfide minerals but also one or more other sulfide minerals (particularly sulfidic gangue minerals) to be separated from the valuable metal sulfide mineral(s)). Typically, the feed material 100 is polymetallic, with some or all of the metals being present as a sulfide. A common feed material 100 includes copper in the form of one or more of chalcopyrite, chalcocite, bornite, covellite, tennantite, enargite, and tetrahedrite and/or molybdenum in the form of molybdenite as the valuable metal sulfide mineral and an iron sulfide mineral that is one or more of pyrite, marcasite, arsenopyrite, and pyrrhotite, as a sulfidic gangue mineral. Gold or silver is typically present. In many applications, iron sulfide is the primary (e.g., more than 50% of the) sulfidic gangue mineral in the feed material 100.

In step 104, the material 100 is slurried and comminuted in an open or closed milling circuit. The comminuted feed material 108 is forwarded to an aeration step 112 prior to the sulfoxy reagent addition step 114.

The water used in forming the slurry of the material 100 can be fresh water, brackish groundwater, saltwater, or any mixture thereof. The process is surprisingly effective in floating valuable metal sulfide minerals whether or not the water is saline and contains dissolved solids or is fresh water. In one process configuration, for example, the water has a salinity of about 0.1 parts per thousand (0.01%) or more.

The optimum liberation size of the material 100 depends on ore type, an understanding of the ore liberation and solution chemistry of the ore, and power and media costs.

The comminuted feed material 108 is in the form of a slurry, preferably having a feed pulp density ranging from about 20 to about 45 wt. %.

The comminuted feed material 108 is subjected to aeration in step 112 in a suitable vessel to form an aerated feed material 132. Aeration is typically performed by sparging, under agitation, an oxidizing gas, preferably a molecular oxygen-containing gas (such as air, substantially pure molecular oxygen, and molecular oxygen-enriched air) through the feed material 108. The oxidizing gas preferably includes at least about 20 vol. % molecular oxygen. Aeration is performed for a time sufficient to allow a thin layer of surface oxidation to form on the surface of the copper and/or molybdenum sulfide minerals 108. The residence time required to produce the desired oxidized film ranges preferably from about 15 to about 120 minutes and more preferably from about 30 to about 60 minutes. In most applications, the pH is not adjusted during aeration or any steps subsequent to aeration.

While not wishing to be bound by any theory, the thin layer of surface oxidation on the copper and/or molybdenum sulfide minerals allows better collector adsorption by the mineral. This is surprising to one of ordinary skill in the art, who would believe that aeration leads to oxidation of the copper and molybdenum sulfide minerals causing reduced floatability and reduced stability of the sulfoxy compound.

In step 114, the sulfoxy reagent 118 is added to the aerated feed material 132 to form a treated feed material 122. Sulfoxy reagent 118 can be added in any suitable manner. Unlike conventional processes, the sulfoxy reagent 118 is added while the aerated feed material 132 is oxygenated. In other words, dissolved molecular oxygen is not removed from the comminuted feed material prior to sulfoxy reagent 118 addition. The dissolved molecular oxygen level in the aerated feed material 132 during conditioning is preferably at least about 3 ppm, more preferably at least about 5 ppm, and even more preferably at least about 10 ppm.

The sulfoxy reagent 118 can be any sulfoxy compound, such as an ammonium, hydrogen, alkali metal, or alkaline earth metal sulfite, bisulfite, metabisulfite, sulfide, polysulfide, thiosulfate, polythionate, or bisulfide, sulfur dioxide, and mixtures and derivatives thereof. The preferred sulfoxy reagent 118 is one or more of an ammonium, hydrogen; alkali metal, or alkaline earth metal sulfite, bisulfite, or metabisulfite, and/or sulfur dioxide, with an ammonium, hydrogen, alkali metal, or alkaline earth metal metabisulfite being even more preferred. While not wishing to be bound by any theory, the sulfoxy reagent 118 is believed to act as a depressant of other sulfide minerals (e.g., iron sulfide gangue minerals, particularly pyrite). As will be appreciated by one of ordinary skill in the art, sulfite ion can be added or formed in situ by a suitable chemical reaction between sulfite ion precursors.

There are a number of different process configurations for sulfoxy reagent 118 addition. In one process configuration, a portion of the sulfoxy reagent 118 is added in one stage, optionally during grinding, with additional amounts being added after aeration and before each of the cleaning, recleaning or scavenging flotation stages. In another process configuration, the majority of the sulfoxy reagent 118 is added in one or more stages after aeration, with additional smaller amounts being optionally added before each of the cleaning, recleaning or scavenging flotation stages. In another process configuration, no sulfoxy reagent 118 is added during any grinding stage but only after aeration. The typical cumulative sulfoxy reagent 118 addition rate, for all addition points, is at least about 50 g/t, more typically at least about 100 g/t, more typically more than 200 g/t, and even more typically from more than 200 g/t to about 1,000 g/t.

While not wishing to be bound by any theory, it is believed that the sulfoxy reagent and oxidizing gas act synergistically to enhance substantially separation selectively and effectiveness, particularly in highly buffering and/or saline waters. While aeration is believed to oxidize sulfide mineral surfaces, which increases floatability of the valuable metal sulfide mineral, the addition of sulfoxy reagent after aeration is believed to control optimally the depression of the other sulfide mineral to be removed as tailings. The increase in floatability, for example, of copper sulfide minerals with aeration while depressing pyrite with the sulfoxy reagent can allow a much improved flotation selectivity than is possible in the absence of aeration. This synergistic effect is best realized when aeration and sulfoxy reagent addition occur sequentially, with aeration preceding sulfoxy reagent addition.

In step 116, the treated feed material 122 is conditioned to form an aerated and conditioned feed material 134. Conditioning is performed in a suitable vessel, or pulp conditioning tank, prior to flotation. In flotation, the amount of agitation and consequent dispersion during conditioning are closely associated with the time required for physical and chemical reactions to take place.

A number of reagents can be added during conditioning, including a collector 120, a frother 124, and other reagents 128. Any suitable collector 120 and frother 124 may be employed. Other reagents 128 include activators, depressants (such as a carbon depressant to depress the flotation of carbonaceous and/or graphitic material), clay dispersants, modifiers, lime (in limited situations as a low cost dispersant or viscosity modifier as examples), and reagents to control electro potential (Eh) and/or pH. Depending on the type of agitation during conditioning, the level of oxygenation may increase. For a downflow agitator, additional molecular oxygen will likely be entrained in the slurry. Conditioning typically occurs for a period between about 0.5 to about 60 minutes and even more typically between about 2 to about 30 minutes.

The aerated and conditioned feed material 134 is floated in step 136, preferably in the presence of sparged air, to form a concentrate fraction 144 commonly containing about 25% or more, more commonly about 40% or more, and even more commonly more than about 50% of the valuable metal sulfide minerals and a tailings fraction 140 commonly containing about 25% or more, more commonly about 40% or more, and even more commonly more than about 50% of the sulfide mineral(s) to be removed as tailings. In the flotation circuit, the aerated and conditioned feed material 134 is floated in a bank, or series, of flotation machines. The flotation machines can be aerated flotation cells.

Flotation may include one or more stages, depending on the application. The number and configuration of roughing, scavenging, and cleaning stages are determined based on criteria known to those skilled in the art.

The selection of the collector 120, frother 124, and other reagents 128 for a specific feed material as well as the pulp density, addition rates of the reagents, order of reagent addition, rate of air addition during flotation, Eh, and other flotation conditions and parameters are also well known to those of ordinary skill in the art.

In one process configuration, the comminution step 104, aeration step 112, conditioning step 116, and flotation step 136 are performed in the substantial or complete absence of pH adjustment by an acid or base (e.g., in the absence of acid or base (e.g., lime, soda ash, and/or caustic soda) addition). In other words, the steps are performed at natural pH, which, for many ores and makeup water, is an alkaline pH of no more than about pH 11, more typically a pH of less than pH 8.5, more typically a pH of no more than about pH 8, and even more typically a pH ranging from about pH 3 to about pH 8. The Eh will typically be greater than about 5 mV and less than about 155 mV and more typically range from about 10 to about 120 mV.

In one process configuration, the comminution step 104, aeration step 112, conditioning step 116, and flotation step 136 are performed in the substantial or complete absence of dissolved molecular oxygen reduction by sparging the slurried feed material with a non-oxidizing gas. The non-oxidizing gas has little, if any, oxidant content and is primarily, if not entirely, an inert gas (e.g., nitrogen and argon), a reducing gas (e.g., a reducing gas other than sulfur dioxide such as carbon dioxide, carbon monoxide, methane, ethane, and/or propane), or a mixture thereof. In one process configuration, the added sulfoxy reagent 118 is substantially free of sulfur dioxide gas. By eliminating sparging by the non-oxidizing gas, a relatively high level of dissolved molecular oxygen can be maintained in the slurry before and after aeration.

Figure 2A:
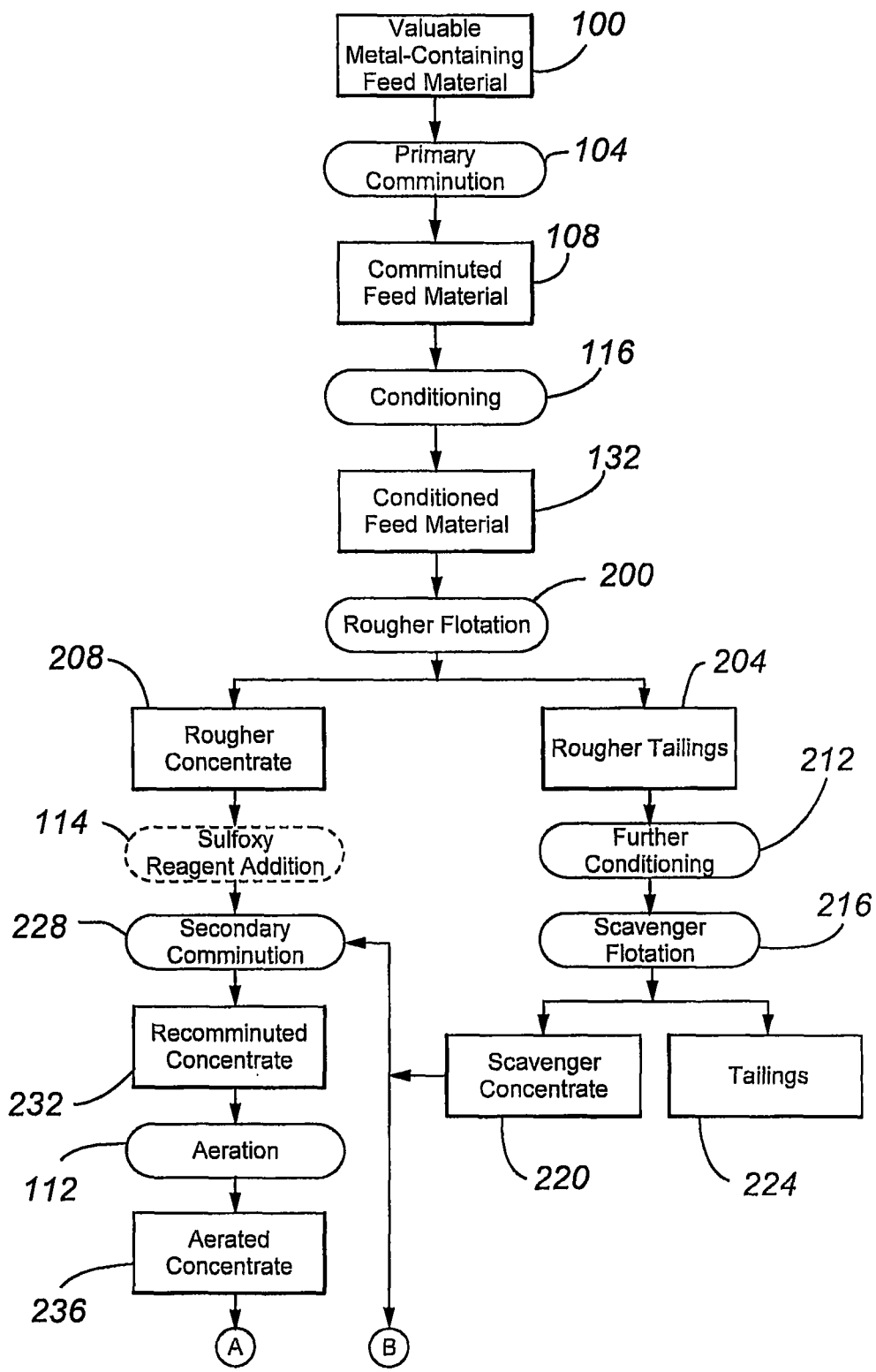
FIGS. 2A-B are a flowchart of a process according to an embodiment.
Figure 2B:
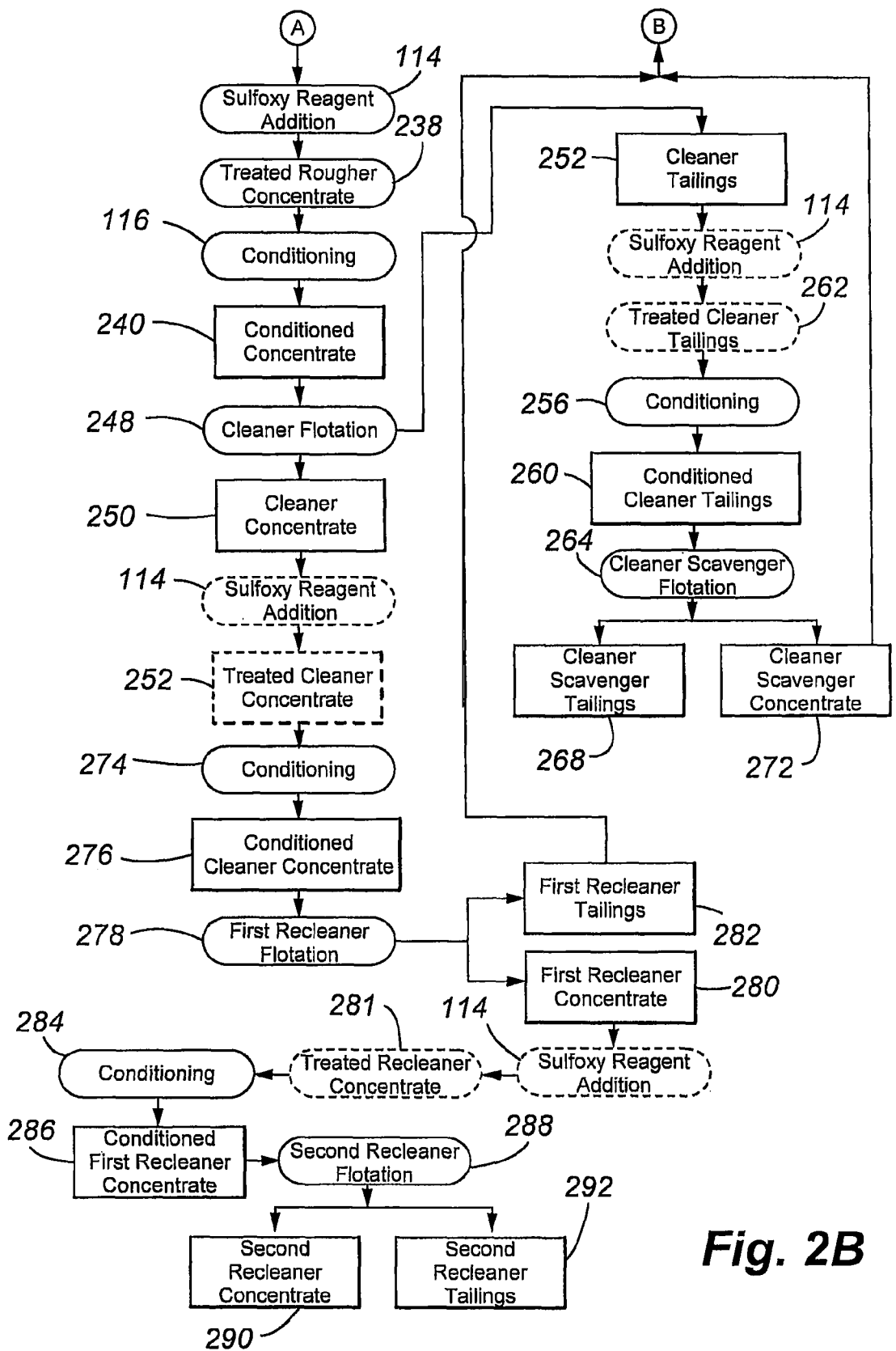

Another process configuration will now be discussed with reference to FIGS. 2A-B. In this example, the valuable metal sulfide mineral is a copper sulfide and the other sulfide mineral (or sulfidic gangue mineral) is one or more of pyrite, marcasite, pyrrhotite, and arsenopyrite.

The valuable metal-containing feed material 100 is comminuted in step 104 to form a comminuted feed material 108.

The comminuted feed material 108 is conditioned in step 116 to form a conditioned feed material 132. The reagents added during conditioning are the collector 120, frother 124, and other reagents 128. No sulfoxy reagent 118 is added.

The conditioned feed material 132 is subjected to rougher flotation in step 200 to form rougher tailings 204 and rougher concentrate 208. While most of the valuable metal sulfide minerals remain in the rougher concentrate 208, the rougher tailings 204 contain a significant portion of the sulfide gangue minerals. As can be seen from FIG. 2A, no sulfoxy reagent 118 has been added prior to rougher flotation.

In step 228, the rougher and scavenger concentrate 208 and 220, respectively, are combined, pulp density adjusted, and recomminuted, in a closed or open comminution circuit, to form a recomminuted concentrate 232. As will be appreciated, the floated iron sulfide minerals in the concentrate fraction 208 are more difficult to separate and require further comminution for effective liberation to be realized.

Sulfoxy reagent 118 may optionally be added during secondary comminution and after aeration. Addition of the sulfoxy reagent in the mill can allow immediate adsorption of the sulfoxy radical on fresh and unoxidized sulfide mineral surfaces. In one configuration, more sulfoxy reagent 118 is added before cleaner flotation than at any other point during the process.

In step 212, the rougher tailings 204 are further conditioned by the addition of collector 120, and, in step 216, the conditioned rougher tailings are subjected to scavenger flotation 216 to produce a scavenger concentrate 220 and scavenger tailings 224. Slower floating copper sulfide minerals are floated during scavenger flotation. The scavenger concentrate 220 is combined with the rougher concentrate 208 and subjected to secondary comminution.

Following secondary comminution step 228, the recomminuted concentrate 232 is subjected, in step 112, to aeration to form an aerated concentrate 236.

In optional step 114, sulfoxy reagent 118 is added to form a treated rougher concentrate 238.

In step 116, the aerated or treated rougher concentrate 236 (as appropriate) is conditioned to form a conditioned concentrate 240. Reagents added during conditioning are the collector 120, frother 124, and other reagents 128. Typically, aeration, sulfoxy reagent addition, and conditioning occur in different vessels, and the dissolved molecular oxygen after aeration is not, prior to sulfoxy reagent addition, reduced by introduction of a non-oxidizing gas.

In step 248, the conditioned concentrate 240 is subjected to cleaner flotation to form cleaner tailings 252 and cleaner concentrate 250. While most of the valuable metal sulfide minerals in the conditioned concentrate 240 remain in the cleaner concentrate 250, the cleaner tailings 252 contain a portion of the valuable sulfide minerals in the conditioned concentrate 240. The cleaner tailings contain a significant amount of the gangue sulfide minerals.

In optional step 114, sulfoxy reagent 118 is added to the cleaner tailings to form a treated cleaner tailings 262.

In step 256, the cleaner tailings 252 or treated cleaner tailings 262 (as the case may be) are conditioned by addition of collector 120 to form conditioned cleaner tailings 260. The conditioned cleaner tailings 260 are subjected to cleaner scavenger flotation in step 264 to form cleaner scavenger tailings 268 and concentrate 272. While most of the valuable metal sulfide minerals in the cleaner tailings 252 remain in the cleaner scavenger concentrate 272, the cleaner scavenger tailings 268 contain a significant portion of the sulfide gangue minerals in the cleaner tailings 252. The cleaner scavenger concentrate 272 is returned to the secondary comminution step 228.

Returning to the cleaner concentrate 250, sulfoxy reagent 118 is, in step 114, optionally added to the cleaner concentrate to form a treated cleaner concentrate 252.

The cleaner concentrate 250 or treated cleaner concentrate 252 (as appropriate) is conditioned in step 274 to form a conditioned cleaner concentrate 276. During conditioning, collector 120 is added.

The conditioned cleaner concentrate 276, in step 278, is subjected to first recleaner flotation to form first recleaner tailings 282 and first recleaner concentrate 280. The first recleaner tailings 282 are returned to the secondary comminution step 228.

In optional step 114, sulfoxy reagent 118 is added to the first recleaner concentrate 280 to form a treated recleaner concentrate 281.

The first recleaner concentrate 280 or treated recleaner concentrate 281 (as the case may be) is conditioned, in step 284, to form a conditioned first recleaner concentrate 286. During conditioning, the first recleaner concentrate 280 collector 120 is added.

In step 288, the conditioned first recleaner concentrate 286 is subjected to second recleaner flotation 288 to form second recleaner tailings 290, which includes preferably at least most and more preferably about 70% or more of the sulfidic gangue minerals in the valuable metal-containing feed material 100, and second recleaner concentrate 292, which includes preferably at least most and more preferably about 70% or more of the valuable metal sulfide minerals in the valuable metal-containing feed material 100.

In the above process, cleaner flotation, cleaner scavenger, and first and second recleaner flotation steps 244, 264, 278, and 288, respectively, are performed at natural pH and ambient temperature.

In the above process, it may be desirable to perform an additional aeration step preceding one or more of the sulfoxy reagent addition steps performed downstream of rougher flotation. Whether or not an additional aeration step is performed depends on the oxidation potential of the slurry before further sulfoxy reagent and collector addition. Prior conditioning, aerating, and floating steps will introduce additional dissolved molecular oxygen into the various slurry streams.

As will be appreciated, other process configurations may be employed depending on the feed material type and mineralogy.

EXPERIMENTAL

The following examples are provided to illustrate certain embodiments of the invention and are not to be construed as limitations on the invention, as set forth in the appended claims. All parts and percentages are by weight unless otherwise specified.

Example 1

Conventional Flotation Methods

This example demonstrates the effect that the composition of water employed in the flotation pulp has on the recovery of copper, when various reagents are used to depress pyrite and concentrate copper. As shown in Table 1, the salt water employed has considerably higher total dissolved solids content and conductivity than the tap water.

TABLE 1

Composition of Tap and Highly Buffered Site Water

| Parameter | Units | Tap Water | Salt Water |
|---|---|---|---|
| pH | pH | 7.81 | 8.48 |
| Conductivity | µS/cm | 0.96 | 5360 |
| TDS | mg/L | 405 | 40225 |
| Sodium | mg/L | 191 | 12060 |
| Potassium | mg/L | 9.3 | 414 |
| Calcium | mg/L | 332 | 426 |
| Magnesium | mg/L | 10.4 | 1297 |
| Iron | mg/L | 0.17 | <0.10 |
| Chloride | mg/L | 199 | 20738 |
| Bicarbonate | mg/L | 120 | 70 |
| Sulfate | mg/L | NIL | 2890 |

Figure 3:
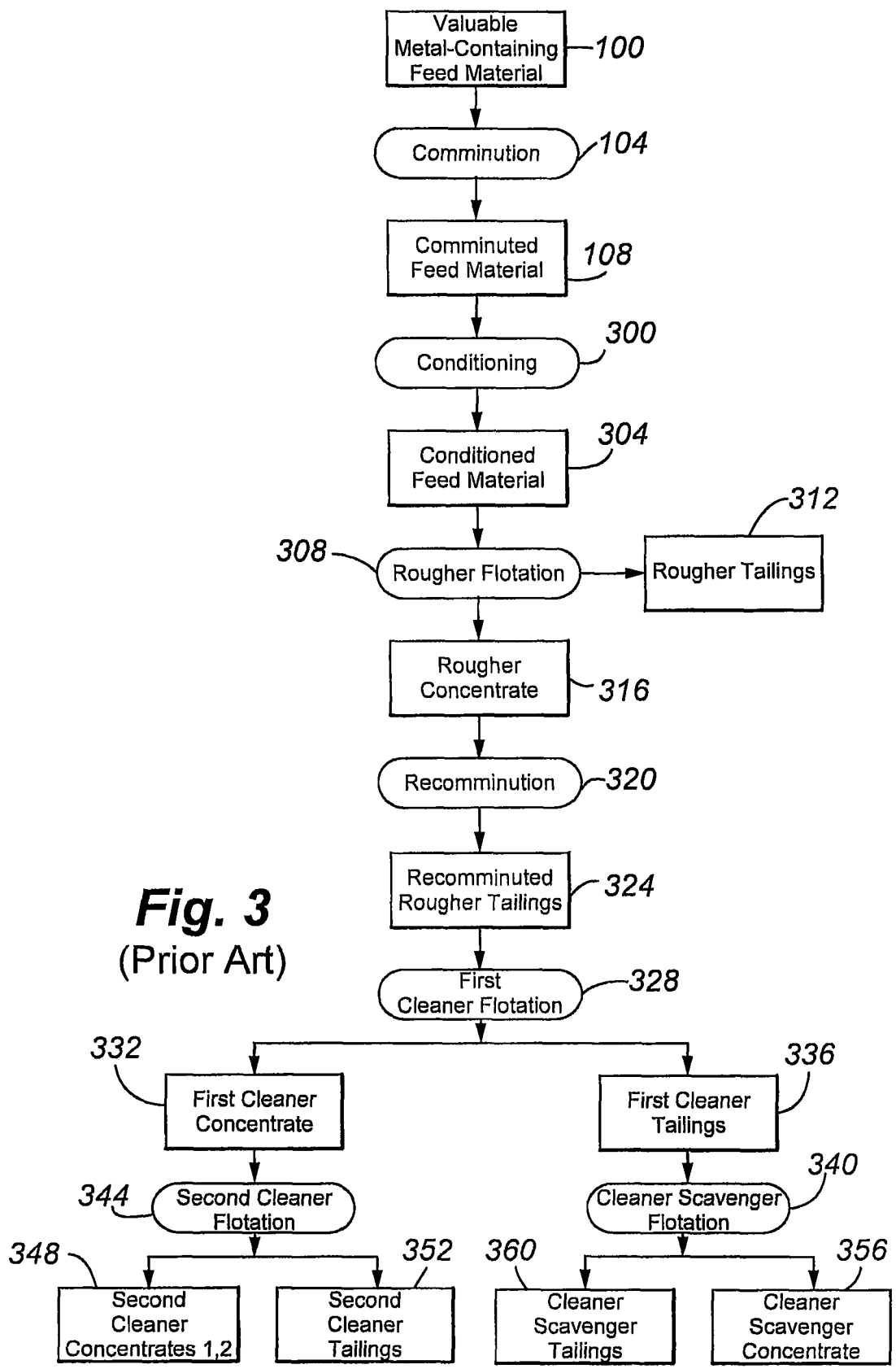
FIG. 3 is a flowchart of a process according to an embodiment.

FIG. 3 is a simplified flow diagram of the kinetics tests conducted in this example. The flow diagram includes comminuted feed material conditioning 300 to form a conditioned feed material 304, rougher flotation 308 of the conditioned feed material 304 (using five flotation machines) to form rougher tailings 312 and rougher concentrate 316, secondary comminution 320 of the rougher concentrate 316 to form recomminuted rougher tailings 324, first cleaner flotation 328 of the recomminuted rougher tailings 324 to form a first cleaner concentrate 332 and first cleaner tailings 336, second cleaner flotation 344 of the first cleaner concentrate 332 to form second cleaner concentrates 1,2 348 and second cleaner tailings 352, and cleaner scavenger flotation 340 of the first cleaner tailings 336 to form a cleaner scavenger concentrate 356 and cleaner scavenger tailings 360.

The five rougher stages for the kinetics tests described below were performed in a similar manner using two water sources: tap water, and water with a high degree of Total Dissolve Solids (TDS) (Salt Water). All tests were carried out on ore ground to $P_{80}$ 212 microns for the rougher stages and reground to $P_{80}$ 20-25 microns for the cleaner scavenger. Other than reagent addition, the tests were carried out using the same conditions.

The effect of different reagent additions on sulfide depression and the associated copper grade/recovery was investigated. The reagents employed were none, lime, lime and sodium cyanide, and lime cyanide and Potassium Amyl Xanthate ("PAX").

The composition of the feed (ore) material employed in all the tests is shown in Table 2. The initial feed pulp density was 34%. The experimental conditions are shown below in Table 3.

TABLE 2

Feed ore employed in flotation tests with tap and salt water

| Parameter | Unit | Assay |
|---|---|---|
| Copper | % | 0.478 |
| Iron | % | 3.66 |
| Gold | g/t | 0.28 |
| Total Sulfur | % | 4.34 |
| Sulfide Sulfur | % | 1.84 |

TABLE 3

Reagent addition and operating conditions for flotation tests performed with tap and salt water

| Test Description | pH rougher | pH cleaner | Eh mV rougher | Eh mV cleaner | A3894 (g/t) | MX950 (g/t) | PAX (g/t) | NACN (g/t) | MIBC drops | Lime (g/t) | Float time (min) |
|---|---|---|---|---|---|---|---|---|---|---|---|
| Tap Water | | | | | | | | | | | |
| Baseline | 7.3 | 7.2 | 98 | 121 | 9 | 37 | | 0 | 16 | 0 | 30.5 |
| Baseline with lime | 7.35 | 10.2 | 119 | −4 | 9 | 37 | | 0 | 7 | 295 | 30.5 |
| Baseline with lime and cyanide | 7.4 | 10.2 | 127 | −27 | 9 | 37 | | 20 | 11 | 205 | 30.5 |
| Baseline with lime, cyanide and PAX | 7.5 | 10.2 | 105 | −27 | 21 | | 46 | 20 | 10 | 220 | 30.5 |
| Salt Water | | | | | | | | | | | |
| Baseline | 7.1 | 7 | 154 | 125 | 9 | 37 | | 0 | 16 | 0 | 30.5 |
| Baseline with lime | 7.2 | 10.2 | 126 | 7 | 9 | 37 | | 0 | 16 | 2480 | 30.5 |
| Baseline with lime and cyanide | 7.4 | 10.2 | 96 | −21 | 9 | 37 | | 20 | 11 | 1500 | 30.5 |
| Baseline with lime, cyanide and PAX | 7.4 | 10.0* | 108 | −16 | 21 | | 46 | 20 | 12 | 1820 | 30.5 |

FIGS. 5 and 6 above show the grade recovery curves for the four reagent schemes for tap water and salt water, respectively. For all of the reagent schemes tested, the grade recovery curves for low TDS tap water were better than those achieved with salt water. Tap water with Lime Cyanide and PAX has the best grade recovery curve. Compared to tap water, conventional techniques employed for pyrite depression do not perform as well in salt water.

Example 2

Aeration/Sulfoxy Reagent Methods

Additional tests were conducted using a similar flotation circuit as employed in example 1 with the exception of the addition of 300 g/t before the first stage of cleaner flotation and an additional 300 g/t metabisulfite (MBS) (the sulfoxy reagent) during the secondary grind. In other words and as shown in Table 4 below, a total of 600 g/t MBS has been added in the flotation circuit.

Figure 4:
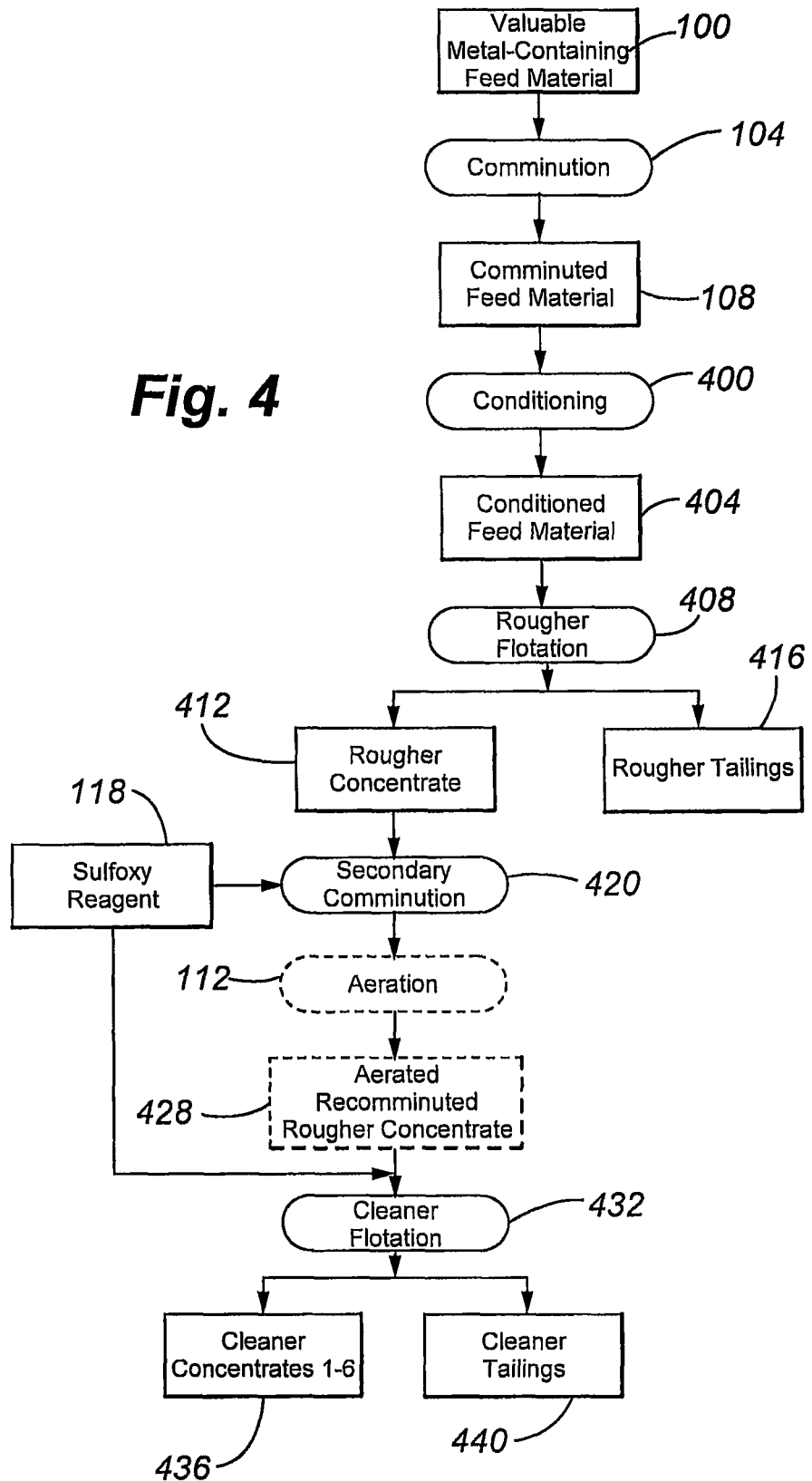
FIG. 4 is a flowchart of a process according to an embodiment.

The flotation circuit is shown in the flow chart of FIG. 4. The flow chart includes conditioning 400 of the comminuted feed material 108 to form conditioned feed material 404, rougher flotation 408 (using five flotation machines or stages) to form rougher concentrate and tailings fractions 412 and 416, respectively, secondary comminution 420 of the rougher concentrate 412, in the presence of sulfoxy reagent 118, to form a recomminuted rougher concentrate 412, aeration 112 of the recomminuted rougher concentrate 412 (for 0 (which means no aeration was performed) or 30 minutes) to form aerated recomminuted rougher concentrate 428, sulfoxy reagent 118 addition prior to cleaner flotation 432, and cleaner flotation 432 of the aerated recomminuted rougher concentrate 428 to form cleaner concentrate 1-6 and cleaner tailings 436 and 440, respectively.

Again, the same two types of water where employed: tap water and salt water with a high degree of TDS (Salt Water). All tests were carried out on feed (ore) material ground to $P_{80}$ 212 microns for the five rougher stages and reground to $P_{80}$ 20-25 microns for the cleaner scavenger. Other than reagent addition, the tests were carried out using the same conditions. The initial feed pulp density was about 34%, and the feed (ore) material was the same as that employed in example 1. The experimental conditions are shown below in Table 4. The tests were carried out with and without a 30-minute aeration step after the secondary comminution step, or secondary grind, and prior to the cleaning flotation circuit. The effect of the aeration before MBS addition on sulfide depression and copper grade/recovery was investigated. For reference, the grade recovery curve with lime cyanide and PAX is shown.

Example 3

Aeration/Sulfoxy Reagent Methods

Additional tests were conducted using the same flotation circuit of FIG. 4 as employed in example 2, with the exception that brackish site water was employed. Analysis of the site water is shown in Table 5. The tests were carried out, with and without, a 30-minute aeration step after the secondary grind and prior to the cleaning flotation circuit. The effect of the aeration, after MBS addition, on sulfide depression and copper grade/recovery was investigated. For reference the grade recovery curve with tap water is shown in FIG. 10.

TABLE 5

Composition of Tap and Highly Buffered Site Water

| Parameter | Units | Site Water |
| --- | --- | --- |
| pH | pH | 7.02 |
| Conductivity | μS/cm | 10.38 |
| TDS | mg/L | 7515 |
| Sodium | mg/L | 1940 |
| Potassium | mg/L | 11.2 |
| Calcium | mg/L | 620 |
| Magnesium | mg/L | 84.5 |
| Iron | mg/L | <0.10 |
| Chloride | mg/L | 2535 |
| Bicarbonate | mg/L | 30 |
| Sulfate | mg/L | 1198 |

TABLE 4

Reagent addition and operating conditions for flotation tests performed with tap and salt water

| | pH | | Eh mV | | Reagent Addition | | | | | Float time |
| --- | --- | --- | --- | --- | --- | --- | --- | --- | --- | --- |
| | | | | | A3894 | MX950 | MBS | MIBC | Lime | |
| Test Description | rougher | cleaner | rougher | cleaner | (g/t) | (g/t) | (g/t) | drops | (g/t) | (min) |
| Site Water | | | | | | | | | | |
| MBS with aeration | 7.4 | 5.6 | P115 | 85 | 9 | 37 | 600 | 13 | 0 | 30.5 |
| MBS with no aeration | 7.4 | 4.8 | 91 | 95 | 9 | 37 | 600 | 12 | 0 | 30.5 |
| Salt Water | | | | | | | | | | |
| MBS with aeration | 7.5 | 5.2 | 101 | 94 | 9 | 37 | 600 | 12 | 0 | 30.5 |
| MBS with no aeration | 7.5 | 4.9 | 103 | 90 | 9 | 37 | 600 | 14 | 0 | 31.5 |

As can be observed from the grade recovery curves of FIGS. 7-8, the use of MBS improves the copper grade recovery curves in both water types. The effect is most pronounced in salt water. However, it is not until aeration is employed that the grade recovery achieved in salt water begins to approximate that observed in the tap water. A graph more clearly comparing the copper grade recovery, with and without aeration, is shown in FIG. 9. In salt water, MBS addition improves the copper recovery from 50% to 75% at the same copper grade of 32%.

Example 4

Locked Cycle Testing

Locked cycle tests were performed using differing ore types and a saline and buffered site water to compare flotation performed using sulfoxy reagent addition with that performed using cyanide as a depressant in the absence of aeration and sulfoxy reagent addition. The various ores were copper sulfide ores containing substantial levels of iron sul fides. Actual locked cycle tests using site water are generally deemed to provide more valuable information than open cleaner tests. A summary of the locked cycle tests is presented in Tables 6-7:

TABLE 6

Locked cycle test results for the drop weight samples using the cyanide as a depressant and site water

| Comp No | % of ore deposit | Head grade Cu, % | Conc Grade Cu, % | Mass Pull | Recovery Cu, % |
|---|---|---|---|---|---|
| 1 | 5.0 | 0.59 | 28.3 | 1.9 | 91.7 |
| 2 | 2.0 | 0.42 | 28.2 | 1.08 | 72.2 |
| 3 | 5.0 | 0.61 | 32.9 | 1.51 | 80.9 |
| 4 | 3.0 | 0.51 | 31.3 | 1.41 | 86.1 |
| 5 | 3.0 | 0.69 | 30.5 | 1.88 | 83.6 |
| 6 | 4.0 | 0.43 | 33.3 | 1.14 | 88.5 |
| 7 | 6.0 | 0.36 | 25.4 | 1.1 | 78 |
| 8 | 5.0 | 0.67 | 29.8 | 2.01 | 89.5 |
| 9 | 7.0 | 0.60 | 34 | 1.59 | 89.9 |
| 10 | 9.0 | 0.61 | 32.2 | 1.7 | 90.1 |
| 11 | 4.0 | 0.56 | 29.8 | 1.66 | 87.5 |
| 12 | 11.0 | 0.51 | 32.9 | 1.37 | 88.8 |
| 13 | 5.0 | 0.56 | 26.7 | 1.64 | 81 |
| 14 | 1.0 | 0.64 | 31 | 1.73 | 84.5 |
| 15 | 8.0 | 0.52 | 28.7 | 1.42 | 78.5 |
| 16 | 4.0 | 0.53 | 30.7 | 1.49 | 87.1 |
| Weighted average | | 0.55 | 30.59 | 1.53 | 85.7 |

TABLE 7

Locked cycle test results for the drop weight samples using the Aeration/Metabisulfite Process and site water

| Comp No | % of ore deposit | Head grade Cu, % | Conc Grade Cu, % | Mass Pull | Recovery Cu, % |
|---|---|---|---|---|---|
| 1 | 5.0 | 0.6 | 33.7 | 1.66 | 93.6 |
| 2 | 2.0 | 0.44 | 33.6 | 1.2 | 92.1 |
| 3 | 5.0 | 0.63 | 36.6 | 1.66 | 92.2 |
| 4 | 3.0 | 0.51 | 34.4 | 1.38 | 93.3 |
| 5 | 3.0 | 0.7 | 34 | 1.98 | 93.8 |
| 6 | 4.0 | 0.44 | 34.7 | 1.09 | 91.3 |
| 7 | 6.0 | 0.41 | 29 | 1.32 | 92.6 |
| 8 | 5.0 | 0.75 | 37.6 | 1.09 | 87.6 |
| 9 | 7.0 | 0.60 | 37.4 | 1.49 | 91 |
| 10 | 9.0 | 0.57 | 33.3 | 1.65 | 90.4 |
| 11 | 4.0 | 0.6 | 34.7 | 1.58 | 91.7 |
| 12 | 11.0 | 0.48 | 33.2 | 1.44 | 92.4 |
| 13 | 5.0 | 0.56 | 24.8 | 2.11 | 90.6 |
| 14 | 1.0 | 0.6 | 33.7 | 1.78 | 93.5 |
| 15 | 8.0 | 0.51 | 32 | 1.43 | 90.3 |
| 16 | 4.0 | 0.53 | 36.8 | 1.3 | 90.1 |
| Weighted average | | 0.55 | 33.55 | 1.50 | 91.42 |

Both Tables 6-7 show that flotation with aeration followed by ammonium metabisulfite addition yielded significantly better results than flotation using cyanide as an iron sulfide depressant. On average, copper recovery was about 6% higher with about a 3% higher copper concentrate grade for flotation performed with aeration followed by ammonium metabisulfite addition.

A number of variations and modifications of the invention can be used. It would be possible to provide for some features of the invention without providing others.

For example, the sulfoxy reagent has different modes of operation depending on the mineralogies and slurry conditions (e.g., Eh and pH) involved. Sulfoxy reagent, for example, can act as a depressant and/or activator for the same sulfide mineral under differing slurry conditions or as a depressant for one sulfide mineral and/or activator for a different sulfide mineral under a common set of conditions. For example, under one set of conditions, the sulfoxy reagent activates flotation of copper, lead, and zinc sulfides and under a different set of conditions activates flotation only of copper sulfides and not lead and zinc sulfides. In another example, the sulfoxy reagent depresses flotation of zinc sulfide but not lead sulfide.

In other examples, the concentrate and tailings can each include different valuable metal sulfide minerals. The valuable metal in the tailings can later be isolated from any gangue sulfide minerals by subsequent flotation stages. Examples of base metal mixed sulfide ores amenable to the process discussed herein include copper-gold (e.g., as calayerite (AuTe2) or sylvanite (Au,Ag)Te2)), copper-gold-silver (e.g., as acanthite (Ag2S), sylvanite (Au,Ag)Te2), pyrargyrite (Ag3SbS3), and proustite (Ag3AsS3)), lead (e.g., as galena (PbS), altaite (PbTe), bournonite (PbCuSbS3), jamesonite (Pb4FeSb6S14), and cylindrite (Pb3Sn4FeSb2S14))-zinc (e.g., as sphalerite (ZnS))-copper, copper-zinc, and copper-molybdenum. Massive sulfide ores, for instance, usually contain sulfides of three or more valuable metals as well as gangue sulfide minerals, such as pyrite.

The present invention, in various embodiments, configurations, or aspects, includes components, methods, processes, systems and/or apparatus substantially as depicted and described herein, including various embodiments, configurations, aspects, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process for recovering one or more metals, comprising:
   providing a slurried valuable metal-containing feed material comprising at least one of a copper sulfide and molybdenum sulfide mineral as a valuable metal sulfide mineral, wherein the slurried valuable metal-containing feed material comprises one or more of brackish water and salt water having one or more of a salinity of about 0.01% or more and a total dissolved solids of at least about 10,000 mg/L and a gangue sulfide mineral comprising iron pyrite;
   aerating, with a molecular oxygen-containing gas, the slurried valuable metal-containing feed material to form an aerated slurried feed material;
   thereafter contacting the aerated slurried feed material, in the presence of at least about 3 ppm of dissolved molecular oxygen, with a sulfoxy reagent to form a treated slurried feed material; and
   floating the treated slurried feed material to form a concentrate comprising at least most of the at least one of a copper sulfide and molybdenum sulfide mineral in the aerated slurried feed material and tailings comprising the gangue sulfide mineral in the aerated slurried feed material.

2. The process of claim 1, wherein the one or both of the brackish water and a salt water has at least one of a salinity of about 2.5% or more and a total dissolved solids of about 10,000 mg/L or more, and wherein the at least one of a copper sulfide and molybdenum sulfide mineral is a copper sulfide mineral.

3. The process of claim 1, wherein the one or both of the brackish water and a salt water has at least one of a salinity of about 2.5% or more and a total dissolved solids of about 10,000 mg/L or more, and wherein, prior to the floating step, the slurried valuable metal-containing feed material is not contacted with an externally generated non-oxidizing gas to lower a dissolved molecular oxygen content of the slurried valuable metal-containing feed material.

4. The process of claim 1, wherein the one or both of the brackish water and a salt water has a salinity of about 3.5% or more, wherein the at least one of a copper sulfide and molybdenum sulfide mineral is a copper sulfide mineral and wherein at least about 50 g/t of the sulfoxy reagent is added to the aerated slurried feed material.

5. The process of claim 1, wherein the floating step is a cleaner flotation, wherein the slurried valuable metal-containing feed material is a rougher concentrate of a rougher flotation, wherein the at least one of a copper sulfide and molybdenum sulfide mineral is a copper sulfide mineral, and wherein the slurried valuable metal-containing feed material is free of contact with a sulfoxy reagent prior to the rougher flotation.

6. The process of claim 5, wherein the rougher concentrate is subjected to secondary comminution before the floating step, wherein the treated slurried feed material has a pH of less than pH 8, and wherein sulfoxy reagent is contacted with the aerated slurried feed material during secondary comminution and after the aerating step.

7. The process of claim 1, wherein the one or both of the brackish water and a salt water has at least one of a salinity of about 3.0% or more and a total dissolved solids of at least about 25,000 mg/L, wherein the aerated slurried feed material has a dissolved molecular oxygen content of more than 5 ppm in the thereafter contacting step and wherein the sulfoxy reagent is one or more of an ammonium, hydrogen, alkali, or alkaline earth metal sulfite, bisulfite, and metabisulfite.

8. The process of claim 1, wherein the one or both of the brackish water and a salt water has at least one of a salinity of about 2.5% or more and a total dissolved solids of about 10,000 mg/L or more, and wherein the slurried valuable metal-containing feed material is free of pH adjustment before and during flotation.

9. The process of claim 1, wherein the one or both of the brackish water and a salt water has at least one of a salinity of about 2.5% or more and a total dissolved solids of at least about 20,000 mg/L and wherein flotation is performed at a natural pH of the treated slurried feed material.

10. The process of claim 1, wherein the one or both of the brackish water and a salt water has at least one of a salinity of about 2.5% or more and a total dissolved solids of about 10,000 mg/L or more, wherein the valuable metal sulfide mineral is one or more of chalcocite ($Cu_2S$), bornite ($Cu_5FeS_4$), chalcopyrite ($CuFeS_2$), covellite ($CuS$), tetrahedrite ($Cu_{12}Sb_4S_{13}$), tennantite ($Cu_{12}As_4S_{13}$), enargite ($Cu_3AsS_4$), and molybdenite ($MoS_2$)), and the gangue sulfide mineral further comprises one or more of marcasite ($FeS_2$), pyrrhotite ($Fe_{1-x}S$), and arsenopyrite ($FeAsS$).

11. The process of claim 1, wherein the one or both of the brackish water and a salt water has at least one of a salinity of about 2.5% or more and a total dissolved solids of about 10,000 mg/L or more, and wherein a layer of surface oxidation is formed on the at least one of a copper sulfide and molybdenum sulfide mineral during the aerating step.

12. The process of claim 1, wherein the one or both of the brackish water and a salt water has at least one of a salinity of about 2.5% or more and a total dissolved solids of about 10,000 mg/L or more, and wherein the contacting step comprises contacting the sulfoxy reagent with a freshly exposed and unoxidized surface of the valuable metal sulfide mineral.

13. The process of claim 1, further comprising:
   contacting the sulfoxy reagent with the valuable metal sulfide mineral during one or both of a primary or secondary comminution.

14. The process of claim 1, wherein the at least one of brackish water and salt water is salt water and the salt water is one or more of sea and ocean water having a salinity of about 30 parts per thousand or more.

15. The process of claim 1, wherein the valuable metal sulfide mineral contains one or both of gold and silver.

16. The process of claim 1, wherein iron sulfide comprises 50% or more of the gangue sulfide mineral.

17. The process of claim 16, wherein the valuable metal sulfide mineral is a copper sulfide mineral, wherein the gangue sulfide mineral further comprises one or more of marcasite, pyrrhotite, and arsenopyrite, and wherein the process further comprises:
   comminuting, prior to aerating, the slurried valuable metal-containing feed to form a comminuted feed material; and
   conditioning, after the comminuting step, the comminuted feed material with one or more of a collector and frother to form a condition feed material, wherein the conditioning step is conducted in the absence of any added sulfoxy reagent.

18. The process of claim 17, further comprising:
rougher floating the conditioned feed material to form a rougher concentration and rougher tailings and wherein the rougher floating step is conducted in the absence of any added sulfoxy reagent.

19. The process of claim 1, wherein the one or both of the brackish water and a salt water has at least one of a salinity of about 2.5% or more and a total dissolved solids of about 10,000 mg/L or more, and wherein the slurried valuable metal-containing feed material has a pulp density ranging from about 20 to about 45 wt %.

20. The process of claim 1, wherein the one or both of the brackish water and a salt water has at least one of a salinity of about 2.5% or more and a total dissolved solids of about 10,000 mg/L or more, and wherein the aerating step comprises sparging under agitation.

21. The process of claim 1, wherein the one or both of the brackish water and a salt water has at least one of a salinity of about 2.5% or more and a total dissolved solids of about 10,000 mg/L or more, and wherein the aerating step is performed with an oxidizing gas.

22. The process of claim 1, wherein the molecular oxygen-containing gas is one or more of the following:
  i) air
  ii) pure molecular oxygen;
  iii) molecular oxygen-enriched air; and
  iv) an oxidizing gas having more than about 20 vol. % molecular oxygen.

23. The process of claim 1, wherein the aerating step is performed for one or more of the following periods:
  (i) about 15 to about 120 minutes; and
  (ii) about 30 to about 60 minutes.

24. The process of claim 1, wherein the contacting of the aerated slurried feed material with the sulfoxy reagent to form the treated slurried feed material comprises a first portion of the sulfoxy reagent, the process further comprising one or more of:
  i) contacting a second portion of the sulfoxy reagent during comminution;
  ii) contacting a second portion of the sulfoxy reagent during cleaning;
  iii) contacting a second portion of the sulfoxy reagent during re-cleaning; and
  i) contacting a second portion of the sulfoxy reagent during scavenging.

25. The process of claim 1, further comprising:
conditioning the slurried treated feed material prior to the floating the treated slurried feed material, wherein the conditioning step comprises contacting the slurried treated feed material with one or more of:
  (a) a collector;
  (b) a frother;
  (c) an activator;
  (d) a depressant;
  (e) a clay dispersant;
  (f) a modifier;
  (g) lime; and
  (h) a reagent to control electropotential (Eh), pH or both Eh and pH.

26. The process of claim 1, wherein the one or both of the brackish water and a salt water has at least one of a salinity of about 2.5% or more and a total dissolved solids of about 10,000 mg/L or more, and wherein the floating of the treated slurried feed material is conducted by sparging with air.

27. The process of claim 1, wherein the aerating and floating steps are conducted at a pH from pH 3 to about pH 8 and an Eh of one or more of: greater than about 5 mV and less than about 155 mV or from about 10 to about 120 mV.

28. The process of claim 1, wherein the one or both of the brackish water and a salt water has at least one of a salinity of about 2.5% or more and a total dissolved solids of about 10,000 mg/L or more, and wherein the sulfoxy reagent is free of sulfur dioxide gas.

29. The method of claim 1, wherein the aerated slurried feed material has a dissolved molecular oxygen content of at least about 5 ppm in the thereafter contacting step and wherein the sulfoxy reagent is one or more of an ammonium, hydrogen, alkali, or alkaline earth metal sulfite, bisulfite, and metabisulfite.

30. The method of claim 1, wherein the aerated slurried feed material is not contacted with a non-oxidizing gas to lower the dissolved molecular oxygen content prior to and during the contacting step.

31. The method of claim 1, wherein the dissolved molecular oxygen is not removed from the aerated slurried feed material prior to the contacting step.

32. The method of claim 1, wherein the aerated slurried feed material has a dissolved molecular oxygen content of at least about 10 ppm in the thereafter contacting step and wherein the sulfoxy reagent is one or more of an ammonium, hydrogen, alkali, or alkaline earth metal sulfite, bisulfite, and metabisulfite.

33. A process for recovering one or more metals, comprising:
providing a slurried valuable metal-containing feed material comprising a valuable metal sulfide mineral and a second sulfide mineral comprising iron pyrite to be separated from the valuable metal sulfide mineral, wherein the valuable metal sulfide mineral is at least one of a copper sulfide or molybdenum sulfide, and wherein the slurried valuable metal-containing feed material comprises water having at least one of: a buffered water having one or more of a salinity of about 0.01% or more and a total dissolved solids of at least about 10,000 mg/L, a brackish water having one or more of a salinity of about 0.01% or more and a total dissolved solids of at least about 10,000 mg/L, a salt water, or a mixture thereof;
aerating, with a molecular oxygen-containing gas, the slurried valuable metal-containing feed material to form an aerated slurried feed material;
contacting at least a portion of the aerated slurried feed material with a sulfoxy reagent, in the presence of at least about 3 ppm of dissolved molecular oxygen, to form a sulfoxylated slurry; and
floating the sulfoxylated slurry to form a concentrate.

34. The process of claim 33, wherein the at least one of a copper sulfide and molybdenum sulfide is a copper sulfide, wherein the second sulfide mineral further comprises at least one of marcasite, arsenopyrite, and pyrrhotite, wherein the water is at least one of brackish water and salt water, and wherein one or more of the brackish and salt water have a salinity of about 2.5% or more and a total dissolved solids of at least about 20,000 mg/L.

35. The process of claim 33, wherein the water is at least one of brackish water and salt water, and wherein one or more of the brackish and salt water have a salinity of about 2.5% or more and a total dissolved solids of at least about 10,000 mg/L, wherein, prior to the floating step, the slurried valuable metal-containing feed material is not contacted with an externally generated non-oxidizing gas to lower a dissolved molecular oxygen content of the slurried valuable metal-containing feed material.

36. The process of claim 33, wherein the water is at least one of brackish water and salt water, and wherein one or more of the brackish and salt water have a salinity of about 3.0% or more and a total dissolved solids of at least about 25,000 mg/L, wherein the at least one of a copper sulfide and molybdenum sulfide is a copper sulfide, wherein the second sulfide mineral further comprises a valuable metal other than copper and molybdenum, and wherein at least about 100 g/t of sulfoxy reagent is added to the slurried valuable metal-containing feed material.

37. The process of claim 33, wherein the water is at least one of brackish water and salt water, and wherein one or more of the brackish and salt water have a salinity of about 3.5% or more.

38. The process of claim 33, wherein the slurried valuable metal-containing feed material comprises at least one of salt water and brackish water, wherein one or more of the brackish and salt water has a salinity of about 2.5% or more and a total dissolved solids of at least about 10,000 mg/L, and wherein a dissolved molecular oxygen content of the slurried valuable metal-containing feed material during the contacting step is at least 5 ppm.

39. The process of claim 33, wherein the water of the slurried valuable metal-containing feed material is at least one of salt water and brackish water having a salinity of about 30 parts per thousand or more and wherein a dissolved molecular oxygen content of the aerated slurried feed material is at least about 5 ppm.

40. The process of claim 33, wherein the at least one of a copper sulfide and molybdenum sulfide is a copper sulfide, wherein the floating step is cleaner flotation, wherein the sulfoxy reagent is added to a solution derived from a regrind circuit, wherein the slurried valuable metal-containing feed material is a rougher concentrate of a rougher flotation, wherein the slurried valuable metal-containing feed material is free of contact with a sulfoxy reagent prior to the rougher flotation, and wherein more than 200 g/t of sulfoxy reagent is added to the aerated slurried feed material.

41. The process of claim 33, wherein the water is at least one of brackish water and salt water, wherein the at least one of brackish water and salt water has a salinity of about 30 parts per thousand or more and a total dissolved solids of about 20,000 mg/L or more, wherein the at least one of a copper sulfide and molybdenum sulfide is a copper sulfide, wherein the sulfoxy reagent is one or more of an ammonium, hydrogen, alkali, or alkaline earth metal sulfite, bisulfite, and metabisulfite, and wherein at least about 50 g/t of sulfoxy reagent is added to the aerated slurried feed material.

42. The process of claim 33, wherein the water is at least one or more of a brackish water and a salt water, and wherein one or more of the brackish and salt water has a salinity of about 2.5% or more and a total dissolved solids of at least about 10,000 mg/L and wherein the slurried valuable metal-containing feed material is free of pH adjustment before and during the floating step.

43. The process of claim 33, wherein the water is at least one or more of a brackish water and a salt water, and wherein the one or more of brackish water and salt water has one or more of a salinity of about 2.5% or more and a total dissolved solids of at least about 20,000 mg/L, wherein the valuable metal sulfide mineral is one or more of chalcocite ($Cu_2S$), bornite ($Cu_5FeS_4$), chalcopyrite ($CuFeS_2$), covellite (CuS), tetrahedrite ($Cu_{12}Sb_4S_{13}$), tennantite ($Cu_{12}As_4S_{13}$), enargite ($Cu_3AsS_4$), and molybdenite ($MoS_2$)) and wherein the second sulfide mineral further comprises one or more of marcasite ($FeS_2$), pyrrhotite ($Fe_{1-x}S$), and arsenopyrite (FeAsS).

44. The process of claim 33, wherein, during the aerating step, a layer of surface oxidation is formed on the valuable metal sulfide mineral.

45. The process of claim 33, wherein the contacting step comprises contacting the sulfoxy reagent with a freshly exposed, unoxidized surface of the valuable metal sulfide mineral.

46. The process of claim 33, further comprising:
contacting, during one or both of a primary or secondary comminution, the sulfoxy reagent with the valuable metal sulfide mineral.

47. The process of claim 33, wherein the water is a salt water, and wherein the salt water is one or more of sea and ocean water having a salinity of about 35 parts per thousand or more.

48. The process of claim 33, wherein the water is at least one or more of a brackish water and a salt water, and wherein the one or more of brackish water and salt water has one or more of a salinity of about 2.5% or more and a total dissolved solids of at least about 20,000 mg/L, and wherein the valuable metal sulfide mineral contains one or both of gold and silver.

49. The process of claim 33, wherein the second sulfide mineral comprises a gangue mineral, wherein the second sulfide mineral comprises iron sulfide, and wherein the iron sulfide comprises 50% or more of the gangue mineral.

50. The process of claim 33, wherein the slurried valuable metal-containing feed material has a pulp density ranging from about 20 to about 45 wt %.

51. The process of claim 33, wherein the water is at least one or more of a brackish water and a salt water, and wherein the one or more of brackish water and salt water has one or more of a salinity of about 2.5% or more and a total dissolved solids of at least about 20,000 mg/L, and wherein the aerating step comprises sparging under agitation.

52. The process of claim 33, wherein the water is at least one or more of a brackish water and a salt water, and wherein the one or more of brackish water and salt water has one or more of a salinity of about 2.5% or more and a total dissolved solids of at least about 20,000 mg/L, and wherein the aerating step is performed with an oxidizing gas.

53. The process of claim 33, wherein the molecular oxygen-containing gas is one or more of the following:
i) air
ii) pure molecular oxygen;
iii) molecular oxygen-enriched air; and
iv) an oxidizing gas having more than about 20 vol. % molecular oxygen.

54. The process of claim 33, wherein the aerating step is performed for one or more of the following periods:
(i) from about 15 to about 120 minutes; and
(ii) from about 30 to about 60 minutes.

55. The process of claim 33, wherein the contacting of the aerated slurried feed material with the sulfoxy reagent to form the sulfoxylated slurry comprises a first portion of the sulfoxy reagent, the process further comprising one or more of:
i) contacting a second portion of the sulfoxy reagent during comminution;
ii) contacting a second portion of the sulfoxy reagent during cleaning;
iii) contacting a second portion of the sulfoxy reagent during re-cleaning; and
i) contacting a second portion of the sulfoxy reagent during scavenging.

56. The process of claim 33, further comprising:
conditioning the sulfoxylated slurry prior to the floating the sulfoxylated slurry, wherein the conditioning step comprises contacting the sulfoxylated slurry with one or more of:
(a) a collector;
(b) a frother;
(c) an activator;
(d) a depressant;
(e) a clay dispersant;
(f) a modifier;
(g) lime; and
(h) a reagent to control electropotential (Eh), pH or both Eh and pH.

57. The process of claim 33, wherein the water is at least one or more of a brackish water and a salt water, and wherein the one or more of brackish water and salt water has one or more of a salinity of about 2.5% or more and a total dissolved solids of at least about 20,000 mg/L and wherein the floating of the sulfoxylated slurry is conducted by sparging with air.

58. The process of claim 33, wherein the aerating and floating steps are conducted at a pH from pH 3 to about pH 8 and Eh from one or more of:
greater than about 5 mV and less than about 155 mV or from about 10 to about 120 mV.

59. The process of claim 33, wherein the water is at least one or more of a brackish water and a salt water, and wherein the one or more of brackish water and salt water has one or more of a salinity of about 2.5% or more and a total dissolved solids of at least about 20,000 mg/L and wherein the sulfoxy reagent is free of sulfur dioxide gas.

60. The process of claim 33, wherein the sulfoxy reagent is free of sulfur dioxide gas in the contacting step.

61. The process of claim 33, wherein the aerated slurried feed material has a dissolved molecular oxygen content of at least about 10 ppm in the thereafter contacting step and wherein the sulfoxy reagent is one or more of an ammonium, hydrogen, alkali, or alkaline earth metal sulfite, bisulfite, and metabisulfite.

62. The process of claim 33, wherein the aerated slurried feed material is not contacted with a non-oxidizing gas to lower the dissolved molecular oxygen content prior to and during the contacting step.

63. The process of claim 33, wherein the dissolved molecular oxygen is not removed from the aerated slurried feed material prior to the contacting step.

64. The process of claim 33, wherein the aerated slurried feed material has a dissolved molecular oxygen content of at least about 5 ppm in the thereafter contacting step and wherein the sulfoxy reagent is one or more of an ammonium, hydrogen, alkali, or alkaline earth metal sulfite, bisulfite, and metabisulfite.

65. A process for recovering one or more metals, comprising:
providing a slurried valuable metal-containing feed material comprising a valuable metal sulfide mineral and iron pyrite, wherein the iron pyrite is to be separated from the valuable metal sulfide mineral, wherein the valuable metal sulfide mineral is at least one of a copper sulfide and molybdenum sulfide, and wherein slurried valuable metal-containing feed material comprises one or more of brackish water and salt water, the one or more of brackish water and salt water having one or more of a salinity of about 0.01% or more and a total dissolved solids of at least about 10,000 mg/L;
aerating, with a molecular oxygen-containing gas, the slurried valuable metal-containing feed material to form an aerated slurried feed material;
contacting the aerated slurried feed material with a sulfoxy reagent, in the presence of at least about 3 ppm of dissolved molecular oxygen, to form a treated slurried feed material; and
floating the treated slurried feed material to form a concentrate comprising the valuable metal sulfide mineral and tailings comprising the iron pyrite.

66. The process of claim 65, wherein the one or more of brackish water and salt water has one or more of a salinity of about 2.5% or more and a total dissolved solids of at least about 20,000 mg/L, wherein the at least one of a copper sulfide and molybdenum sulfide is a copper sulfide, wherein the slurried valuable metal-containing feed material further comprises a sulfidic gangue mineral, wherein the sulfidic gangue mineral is at least one of marcasite, arsenopyrite, and pyrrhotite, wherein the tailings further comprise the sulfidic gangue mineral, and wherein the aerated slurried feed material has a pH of less than pH 8.5.

67. The process of claim 65, wherein the one or more of brackish water and salt water has one or more of a salinity of about 2.5% or more and a total dissolved solids of at least about 10,000 mg/L, wherein the at least one of a copper sulfide and molybdenum sulfide is a copper sulfide, wherein the slurried valuable metal-containing feed material and the aerated slurried feed material are each at a natural pH, wherein, prior to the floating step, the slurried valuable metal-containing feed material is not contacted with an externally generated non-oxidizing gas to lower a dissolved molecular oxygen content of the slurried valuable metal-containing feed material, and wherein the aerated slurried feed material has a pH of less than about pH 8.5.

68. The process of claim 65, wherein the one or more of brackish water and salt water has one or more of a salinity of about 2.5% or more and a total dissolved solids of at least about 10,000 mg/L, and wherein a dissolved molecular oxygen content of the aerated slurried feed material during the contacting step is more than 2 ppm.

69. The process of claim 65, wherein the one or more of brackish water and salt water has one or more of a salinity of about 3.0% or more and a total dissolved solids of at least about 25,000 mg/L and wherein a dissolved molecular oxygen content of the aerated slurried feed material is at least about 5 ppm.

70. The process of claim 65, wherein the at least one of a copper sulfide and molybdenum sulfide is a copper sulfide, wherein the floating step is a cleaner flotation, wherein the sulfoxy reagent is added to a solution derived from the feed material in a mill, wherein the mill is in a regrind circuit, wherein the slurried valuable metal-containing feed material is a rougher concentrate of a rougher flotation, and wherein the slurried valuable metal-containing feed material is free of contact with a sulfoxy reagent prior to rougher flotation.

71. The process of claim 65, wherein the one or more of brackish water and salt water has one or more of a salinity of about 3.5% or more, wherein the sulfoxy reagent is one or more of an ammonium, hydrogen, alkali, or alkaline earth metal salt of sulfite, bisulfite, and metabisulfite and wherein more than 100 g/t of the sulfoxy reagent is added to the aerated slurried feed material.

72. The process of claim 65, wherein the one or more of brackish water and salt water has one or more of a salinity of about 2.5% or more and a total dissolved solids of at least about 10,000 mg/L and wherein the slurried valuable metal-containing feed material is free of pH adjustment before and during flotation.

73. The process of claim 65, wherein the at least one of a copper sulfide and molybdenum sulfide is a copper sulfide, wherein the slurried valuable metal-containing feed material contains a valuable metal other than copper and molybdenum, wherein the one or more of a brackish water and a salt water of the slurried valuable metal-containing feed material has at least one or both of a salinity of about 3.5% or more and a total dissolved solids of at least about 25,000 mg/L.

74. The process of claim 65, wherein the one or more of brackish water and salt water having one or more of a salinity of about 3.5% or more and a total dissolved solids of at least about 25,000 mg/L, wherein the valuable metal sulfide mineral is one or more of chalcocite ($Cu_2S$), bornite ($Cu_5FeS_4$), chalcopyrite ($CuFeS_2$), covellite (CuS), tetrahedrite ($Cu_{12}Sb_4S_{13}$), tennantite ($Cu_{12}As_4S_{13}$), enargite ($Cu_3AsS_4$), and molybdenite ($MoS_2$)) and wherein the tailings comprise one or more of marcasite ($FeS_2$), pyrrhotite ($Fe_{1-x}S$), and arsenopyrite (FeAsS).

75. The process of claim 65, wherein the one or more of brackish water and salt water has one or more of a salinity of about 2.5% or more and a total dissolved solids of at least about 10,000 mg/L and wherein, during the aeration step, a layer of surface oxidation is formed on the valuable metal sulfide mineral.

76. The process of claim 65, wherein the one or more of brackish water and salt water has one or more of a salinity of about 2.5% or more and a total dissolved solids of at least about 10,000 mg/L and wherein the contacting step comprises contacting the sulfoxy reagent with a freshly exposed, unoxidized surface on the valuable metal sulfide mineral.

77. The process of claim 65, further comprising:
contacting, during one or both of a primary or secondary comminution, the sulfoxy reagent with the valuable metal sulfide mineral.

78. The process of claim 65, wherein the water is a salt water, and wherein the salt water is one or more of sea and ocean water having a salinity of about 25 parts per thousand or more.

79. The process of claim 65, wherein the valuable metal sulfide mineral contains one or both of gold and silver.

80. The process of claim 79, wherein the molecular oxygen-containing gas is one or more of the following:
i) air
ii) pure molecular oxygen;
iii) molecular oxygen-enriched air; and
iv) an oxidizing gas having more than about 20 vol. % molecular oxygen.

81. The process of claim 79, wherein the aerating step is performed for one or more of the following periods:
(i) from about 15 to about 120 minutes; and
(ii) from about 30 to about 60 minutes.

82. The process of claim 79, wherein the contacting of the aerated slurried feed material with the sulfoxy reagent to form the treated slurried feed material comprises a first portion of the sulfoxy reagent, the process further comprising one or more of:
i) contacting a second portion of the sulfoxy reagent during comminution;
ii) contacting a second portion of the sulfoxy reagent during cleaning;
iii) contacting a second portion of the sulfoxy reagent during re-cleaning; and
i) contacting a second portion of the sulfoxy reagent during scavenging.

83. The process of claim 79, further comprising:
conditioning the treated slurried feed material prior to the floating the treated slurried feed material, wherein the conditioning step comprises contacting the treated slurried feed material with one or more of:
(a) a collector;
(b) a frother;
(c) an activator;
(d) a depressant;
(e) a clay dispersant;
(f) a modifier;
(g) lime; and
(h) a reagent to control electropotential (Eh) and/or pH.

84. The process of claim 79, wherein the aerating and floating steps are conducted at a pH from pH 3 to about pH 8 and Eh from one of:
greater than about 5 mV and less than about 155 mV or
from about 10 to about 120 mV.

85. The process of claim 65, wherein the iron pyrite comprises 50% or more of the tailings.

86. The process of claim 65, wherein the slurried valuable metal-containing feed material has a pulp density ranging from about 20 to about 45 wt %.

87. The process of claim 65, wherein the aerating step comprises sparging under agitation.

88. The process of claim 65, wherein the aerating step is performed with an oxidizing gas.

89. The process of claim 65, wherein the molecular oxygen-containing gas is one or more of the following:
i) air
ii) pure molecular oxygen;
iii) molecular oxygen-enriched air; and
iv) an oxidizing gas having more than about 20 vol. % molecular oxygen.

90. The process of claim 65, wherein the aerating step is performed for one or more of the following periods:
(i) from about 15 to about 120 minutes; and
(ii) from about 30 to about 60 minutes.

91. The process of claim 65, wherein the contacting of the aerated slurried feed material with the sulfoxy reagent to form the treated slurried feed material comprises a first portion of the sulfoxy reagent, the process further comprising one or more of:
i) contacting a second portion of the sulfoxy reagent during comminution;
ii) contacting a second portion of the sulfoxy reagent during cleaning;
iii) contacting a second portion of the sulfoxy reagent during re-cleaning; and
i) contacting a second portion of the sulfoxy reagent during scavenging.

92. The process of claim 65, further comprising:
conditioning the treated slurried feed material prior to the floating the treated slurried feed material, wherein the conditioning step comprises contacting the treated slurried feed material with one or more of:
(a) a collector;
(b) a frother;
(c) an activator;
(d) a depressant;
(e) a clay dispersant;
(f) a modifier;
(g) lime; and
(h) a reagent to control electropotential (Eh) and/or pH.

93. The process of claim 65, wherein the one or more of brackish water and salt water has one or more of a salinity of about 2.5% or more and a total dissolved solids of at least about 10,000 mg/L and wherein the floating of the treated slurried feed material is conducted by sparging with air.

94. The process of claim 65, wherein the aerating and floating steps are conducted at a pH from pH 3 to about pH 8 and Eh from one of:
greater than about 5 mV and less than about 155 mV or from about 10 to about 120 mV.

95. The process of claim 65, wherein the one or more of brackish water and salt water has one or more of a salinity of about 2.5% or more and a total dissolved solids of at least about 10,000 mg/L and wherein the sulfoxy reagent is free of sulfur dioxide gas.

96. The process of claim 65, wherein the floating of the slurried treated feed material is conducted by sparging with air.

97. The process of claim 65, wherein the sulfoxy reagent is free of sulfur dioxide gas.

98. The process of claim 65, wherein the sulfoxy reagent is free of sulfur dioxide gas in the contacting step.

99. The process of claim 65, wherein the aerated slurried feed material has a dissolved molecular oxygen content of at least about 10 ppm in the thereafter contacting step and wherein the sulfoxy reagent is one or more of an ammonium, hydrogen, alkali, or alkaline earth metal sulfite, bisulfite, and metabisulfite.

100. The process of claim 65, wherein the aerated slurried feed material is not contacted with a non-oxidizing gas to lower the dissolved molecular oxygen content prior to and during the contacting step.

101. The process of claim 65, wherein the dissolved molecular oxygen is not removed from the aerated slurried feed material prior to the contacting step.

102. The process of claim 65, wherein the aerated slurried feed material has a dissolved molecular oxygen content of at least about 5 ppm in the thereafter contacting step and wherein the sulfoxy reagent is one or more of an ammonium, hydrogen, alkali, or alkaline earth metal sulfite, bisulfite, and metabisulfite.

103. A process for recovering one or more metals, comprising:
providing a slurried valuable metal-containing feed material comprising at least one of a copper sulfide and molybdenum sulfide mineral as a valuable metal sulfide mineral, wherein the slurried valuable metal-containing feed material comprises a gangue sulfide mineral comprising iron pyrite and one or more of brackish water and salt water having one or more of a salinity of about 0.01% or more and a total dissolved solids of at least about 10,000 mg/L;
aerating, with a molecular oxygen-containing gas, the slurried valuable metal-containing feed material;
contacting the aerated slurried valuable metal-containing feed material with a sulfoxy reagent;
maintaining a dissolved molecular oxygen level in the aerated slurried valuable metal-containing feed material of at least about 3 ppm during the contacting; and
floating the aerated slurried valuable metal-containing feed material, after both aerating with a molecular oxygen-containing gas and contacting with a sulfoxy reagent, to form a concentrate comprising at least most of the at least one of a copper sulfide and molybdenum sulfide mineral in the slurried valuable metal-containing feed material and tailings comprising the gangue sulfide mineral in the slurried valuable metal-containing feed material.

104. The process of claim 103, wherein the one or more of brackish water and salt water has one or more of a salinity of about 2.5% or more and a total dissolved solids of at least about 10,000 mg/L, wherein the at least one of a copper sulfide and molybdenum sulfide mineral is a copper sulfide mineral, and wherein the gangue sulfide mineral in the slurried valuable metal-containing feed material comprises an iron sulfide other than iron pyrite.

105. The process of claim 103, wherein the one or more of brackish water and salt water has one or more of a salinity of about 3.0% or more and a total dissolved solids of at least about 25,000 mg/L, wherein, prior to the floating step, the slurried valuable metal-containing feed material is not contacted with an externally generated non-oxidizing gas to lower a dissolved molecular oxygen content of the slurried valuable metal-containing feed material.

106. The process of claim 103, wherein the one or more of brackish water and salt water has one or more of a salinity of about 3.5% or more, wherein the at least one of a copper sulfide and molybdenum sulfide mineral is a copper sulfide mineral and wherein at least about 50 g/t of the sulfoxy reagent is added to the aerated slurried valuable metal-containing feed material.

107. The process of claim 103, wherein the one or more of brackish water and salt water has one or more of a salinity of about 2.5% or more and a total dissolved solids of at least about 20,000 mg/L, wherein the floating step is a cleaner flotation, wherein the slurried valuable metal-containing feed material is a rougher concentrate of a rougher flotation, wherein the at least one of a copper sulfide and molybdenum sulfide mineral is a copper sulfide mineral, and wherein the slurried valuable metal-containing feed material is free of contact with a sulfoxy reagent prior to the rougher flotation.

108. The process of claim 107, wherein the one or more of brackish water and salt water has one or more of a salinity of about 3.5% or more and a total dissolved solids of at least about 25,000 mg/L, wherein the rougher concentrate is subjected to secondary comminution before the floating step, wherein the slurried valuable metal-containing feed material has a pH of less than pH 8, and wherein sulfoxy reagent is contacted with the aerated slurried valuable metal-containing feed material during secondary comminution.

109. The process of claim 103, wherein the one or more of brackish water and salt water has one or more of a salinity of about 2.5% or more and a total dissolved solids of at least about 10,000 mg/L, wherein the aerated slurried valuable metal-containing feed material has a dissolved molecular oxygen content of at least 5 ppm when the sulfoxy reagent is contacted with the slurried valuable metal-containing feed material, and wherein the sulfoxy reagent is one or more of an ammonium, hydrogen, alkali, or alkaline earth metal sulfite, bisulfate, and metabisulfite.

110. The process of claim 103, wherein the one or more of brackish water and salt water has one or more of a salinity of about 3.0% or more and a total dissolved solids of at least about 20,000 mg/L and wherein the slurried valuable metal-containing feed material is free of pH adjustment before and during flotation.

111. The process of claim 103, wherein the one or both of the brackish water and a salt water has a salinity of about 3.5% or more and a total dissolved solids of at least about 25,000 mg/L and wherein floating is performed at a natural pH of the aerated slurried valuable metal-containing feed material.

112. The process of claim 103, wherein the sulfoxy reagent is free of sulfur dioxide gas in the contacting step.

113. The process of claim 103, wherein the aerated slurried valuable metal-containing feed material has a dissolved molecular oxygen content of at least about 5 ppm in the thereafter contacting step and wherein the sulfoxy reagent is one or more of an ammonium, hydrogen, alkali, or alkaline earth metal sulfite, bisulfite, and metabisulfite.

114. The process of claim 103, wherein the aerated slurried valuable metal-containing feed material is not contacted with a non-oxidizing gas to lower the dissolved molecular oxygen content prior to and during the contacting step.

115. The process of claim 103, wherein the dissolved molecular oxygen is not removed from the aerated slurried valuable metal-containing feed material prior to the contacting step.

116. The process of claim 103, wherein the aerated slurried valuable metal-containing feed material has a dissolved molecular oxygen content of at least about 10 ppm in the thereafter contacting step and wherein the sulfoxy reagent is one or more of an ammonium, hydrogen, alkali, or alkaline earth metal sulfite, bisulfite, and metabisulfite.

117. The process of claim 103, wherein the sulfoxy reagent is free of sulfur dioxide gas in the contacting step.

118. The process of claim 65, wherein the slurried valuable metal-containing feed material and the aerated slurried feed material are free of pH modification before the floating step.

\* \* \* \* \*